United States Patent
Terrier et al.

(10) Patent No.: US 12,440,498 B2
(45) Date of Patent: Oct. 14, 2025

(54) COMBINATION OF DILTIAZEM AND VIRAL POLYMERASE INHIBITORS

(71) Applicants: UNIVERSITE CLAUDE BERNARD LYON 1, Villeurbanne (FR); INSTITUT NATIONAL DE LA SANTE ET DE LA RECHERCHE MEDICALE (INSERM), Paris (FR); CENTRE NATIONAL DE LA RECHERCHE SCIENTIFIQUE (CNRS), Paris (FR); UNIVERSITE LAVAL, Quebec (CA); ECOLE NORMALE SUPERIEURE DE LYON, Lyons (FR)

(72) Inventors: Olivier Terrier, Lyons (FR); Manuel Rosa-Calatrava, Lyons (FR); Guy Boivin, Quebec (CA); Mario-Andres Pizzorno, Lyons (FR); Blandine Padey, Lyons (FR)

(73) Assignees: UNIVERSITE CLAUDE BERNARD LYON 1, Villeurbanne (FR); INSTITUT NATIONAL DE LA SANTE ET DE LA RECHERCHE MEDICALE (INSERM), Paris (FR); CENTRE NATIONAL DE LA RECHERCHE SCIENTIFIQUE (CNRS), Paris (FR); UNIVERSITE LAVAL, Quebec (CA); ECOLE NORMALE SUPERIEURE DE LYON, Lyons (FR)

( * ) Notice: Subject to any disclaimer, the term of this patent is extended or adjusted under 35 U.S.C. 154(b) by 718 days.

(21) Appl. No.: 17/792,403

(22) PCT Filed: Jan. 12, 2021

(86) PCT No.: PCT/FR2021/050049
§ 371 (c)(1),
(2) Date: Jul. 13, 2022

(87) PCT Pub. No.: WO2021/144528
PCT Pub. Date: Jul. 22, 2021

(65) Prior Publication Data
US 2023/0075092 A1 Mar. 9, 2023

(30) Foreign Application Priority Data
Jan. 13, 2020 (FR) ...................................... 2000255

(51) Int. Cl.
*A61K 31/554* (2006.01)
*A61K 9/00* (2006.01)
*A61K 31/5383* (2006.01)
*A61K 45/06* (2006.01)
*A61P 31/16* (2006.01)

(52) U.S. Cl.
CPC .......... *A61K 31/554* (2013.01); *A61K 9/0073* (2013.01); *A61K 31/5383* (2013.01); *A61K 45/06* (2013.01); *A61P 31/16* (2018.01)

(58) Field of Classification Search
CPC ..................................................... A61K 31/554
USPC ...................................................... 514/211.07
See application file for complete search history.

(56) References Cited

U.S. PATENT DOCUMENTS

| | | |
|---|---|---|
| 4,605,552 A | 8/1986 | Fritschi |
| 11,351,180 B2 | 6/2022 | Rosa-Calatrava et al. |
| 2018/0042937 A1 | 2/2018 | Rosa-Calatrava et al. |

FOREIGN PATENT DOCUMENTS

| | | |
|---|---|---|
| EP | 3785716 A1 | 3/2021 |
| WO | 87/007508 A1 | 12/1987 |
| WO | 02/094238 A1 | 11/2002 |
| WO | 2011/066657 A1 | 6/2011 |
| WO | 2016/146836 A2 | 9/2016 |
| WO | 2019193428 A1 | 10/2019 |
| WO | 2019208540 A1 | 10/2019 |
| WO | 2019/224489 A1 | 11/2019 |

OTHER PUBLICATIONS

Pizzorno A, et al. Repurposing of Drugs as Novel Influenza Inhibitors From Clinical Gene Expression Infection Signatures. Front Immunol. 2019, 10(60), 1-17.
Pizzorno A, et al. Drug Repurposing Approaches for the Treatment of Influenza Viral Infection: Reviving Old Drugs to Fight Against a Long-Lived Enemy. Front Immunol. 2019, 10(531), 1-12.
Wang W, et al. The Cap-Snatching SFTSV Endonuclease Domain Is an Antiviral Target. Cell Rep. 2020, 3(1), 153-163.
Omoto S, et al. Characterization of influenza virus variants induced by treatment with the endonuclease inhibitor paloxavir marboxil. Sci Rep. 2018,8(1):9633, 1-15.
Jehara T, et al. Treatment-Emergent Influenza Variant Viruses With Reduced Baloxavir Susceptibility: Impact on Clinical and Virologic Outcomes in Uncomplicated Influenza. J Infect Dis. 2019, 1-10. DOI: 10.1093/infdis/jiz244.

(Continued)

*Primary Examiner* — Raymond J Henley, III
(74) *Attorney, Agent, or Firm* — Arrigo, Lee, Guttman & Mouta-Bellum LLP

(57) ABSTRACT

The invention relates to a combination of Diltiazem and at least one viral polymerase inhibitor compound selected from among Baloxavir marboxil, Pimodivir, RO-7 and CC-42344. The invention relates in particular to the therapeutic use of said combination in the prevention and/or treatment of a viral infection, in particular of the respiratory and/or intestinal tract of a human or animal body.

25 Claims, 14 Drawing Sheets

(56) References Cited

OTHER PUBLICATIONS

Takashita E, et al. Influenza A(H3N2) virus exhibiting reduced susceptibility to baloxavir due to a polymerase acidic subunit I38T substitution detected from a hospitalised child without prior baloxavir treatment, Japan, Jan. 2019. Euro Surveill. 2019, 24(12), 1-4.
Hayden FG and Shindo N. Influenza virus polymerase inhibitors in clinical development. Curr Opin Infect Dis. 2019, 32 (2), 176-186.
Fukao K, et al. Combination treatment with the cap-dependent endonuclease inhibitor baloxavir marboxil and a neuraminidase inhibitor in a mouse model of influenza A virus infection. J Antimicrob Chemother. 2019, 74(3), 654-662.
Hayden FG, et al. Baloxavir Marboxil for Uncomplicated Influenza in Adults and Adolescents. N Engl J Med, 2018, 379(10), 913-923.
Noshi T, et al. In vitro characterization of baloxavir acid, a first-in-class cap-dependent endonuclease inhibitor of the influenza virus polymerase PA subunit. Antiviral Res. 2018, 160, 109-17.
Clark MP, et al. Discovery of a novel, first-in-class, orally bioavailable azaindole inhibitor (VX-787) of influenza PB2. J Med Chem. 2014, 57(15), 6668-6678.
Trevejo JM, et al. Pimodivir treatment in adult volunteers experimentally inoculated with live influenza virus: a Phase IIa, randomized, double-blind, placebo-controlled study. Antivir Ther. 2018, 23(4), 335-344.
Yousuke Furuta, et al. T-705 (favipiravir) and related compounds: Novel broad-spectrum inhibitors of RNA viral Infections. Antiviral Research, 2009, 82(3), 95-102.
Goldhill DH, et al. The mechanism of resistance to favipiravir in influenza. Proc Natl Acad Sci USA. 2018, 115(45), 11613-11618.

Synergy and antagonism (Loewe)
DIL+FAV

Transepithelial resistance measurement of epithelia infected with H1N1

- Untreated
- Baloxavir 10 nm
- DMSO Eq10 nM
- Diltiazem 90 µM
- Dil 90 µM + Bal 10 nM

Combined diltiazem + baloxavir treatment on epithelia infected with H3N2

- Untreated
- Baloxavir 10 nm
- DMSO Eq10 nM
- Diltiazem 90 µM
- Dil 90 µM + Bal 10 nM

Figure 4d

Monotherapy treatment with diltiazem and baloxavir on epithelia infected with 138T resistant H1N1

- Untreated
- Baloxavir 10 nm
- Baloxavir 100 nm
- Diltiazem 90 µM

Figure 4e

Transepithelial resistance measurement of epithelia infected with 138T resistant H1N1

- Untreated
- Baloxavir 10 nm
- Baloxavir 100 nm
- Diltiazem 90 µM

Figure 5a

Apical pole infection

H1N1 I38T (MOI 0.1)

Tissue lysis

Supernatant sampling at the apical pole 0  5      24      48        72  hpi

Baso-lateral treatments with diltiazem (90 μM) or baloxavir
(10 nM or 100 nM) or combination of both molecules
(diltiazem 90 μM + baloxavir 10 nM and 100 nM)

Figure 5b

Combined treatment with diltiazem + baloxavir on epithelia infected with I38T resistant H1N1

- Untreated
- Baloxavir 10 nm
- DMSO Eq10 nM
- Diltiazem 90 μM
- Dil 90 μM + Bal 10 nM Viral titration (TCID50/mL)

24 hpi, 48 hpi, 72 hpi

Figure 5c

Transepithelial resistance measurement of epithelia infected with 138T resistant H1N1

- Untreated
- Baloxavir 10 nm
- DMSO Eq10 nM
- Diltiazem 90 μM
- Dil 90 μM + Bal 10 nM

Figure 5d

Combined diltiazem + baloxavir treatment on epithelia infected with 138T resistant H1N1

- Untreated
- Baloxavir 100 nm
- Diltiazem 90 μM
- Dil 90 μM + Bal 100 nM

Figure 5e

Transepithelial resistance measurement of epithelia infected with 138T resistant H1N1

- Untreated
- Baloxavir 100 nm
- Diltiazem 90 µM
- Dil 90 µM + Bal 100 nM

Median inhibitory concentration of baloxavir on H1N1wt

Median inhibitory concentration of baloxavir on H1N1NTP10

→ Untreated P10

Median inhibitory concentration of baloxavir on H1N1ND25P10

→ Diltiazem P10

Median inhibitory concentration of baloxavir on H1N1NBaloxP8

Median inhibitory concentration of baloxavir on H1N1CombP6

IC50 = 0.8nM

COMBINATION OF DILTIAZEM AND VIRAL POLYMERASE INHIBITORS

FIELD OF THE INVENTION

The presents invention relates to a novel combination of at least two antiviral compounds.

The present invention relates in particular to this combination for its use in the prevention and/or treatment of viral infections.

More particularly, the present invention relates to this combination for its therapeutic use in the prevention and/or treatment of a viral infection, in particular affecting the respiratory and/or intestinal epithelial cells.

STATE OF THE ART

Human acute respiratory infections (ARIs) are one of the main causes of consultations, hospitalizations and death in the world and especially are the leading cause of mortality in young children with more than 2 million deaths a year.

Among the etiological agents responsible for acute respiratory infections, viruses occupy a predominant place. Indeed, they are found in the majority of childhood pneumonia cases and are a predisposing factor for bacterial pneumonia in adults.

Among the most representative viruses in terms of frequency (seasonal epidemics) and morbidity, type A and B influenza viruses are prevalent and also constitute a risk factor for recurrent pandemic. Influenza viruses also constituent etiological agents contributing to an increased comorbidity and comortality in the case of respiratory co-infections and also contribute to the emergence of anti-biotic-resistant bacterial strains, which fundamentally threaten the effectiveness of antibiotic treatments in humans and animals.

In terms of prophylactic or therapeutic treatments for viruses, especially influenza viruses, the current arsenal is rather limited.

Currently, vaccination is the main strategy for preventing flu. However, the use of vaccines has disadvantages. For example, during the appearance of a new seasonal viral strain, a time period of 6 to 9 months is necessary to develop and prescribe a new vaccine. Moreover, vaccines lose efficacy when the circulating strains mutate. Finally, it is difficult or even impossible to produce vaccines against certain pandemic strains of avian origin such as H5N1 or H7N9, by the conventional vaccine production process based on embryonated chicken egg.

The journal (Pizzorno et al., 2019b) presents the main therapeutic compounds used in the context of flu treatment, as well as their modes of action.

When a therapeutic action is necessary, the main antiviral compounds currently used are as follows: Oseltamivir/Tamiflu® (ROCHE); zanannivir/Relenza® (GSK); and baloxavir marboxil/Xofluza® (ROCHE) which is available in several countries including the United States and Japan.

Zanamivir and oseltamivir are neuraminidase inhibitors.

Baloxavir marboxil is an inhibitor of the polymerase complex of influenza viruses; it has also recently been characterized as an inhibitor of polymerases of other negative-strand RNA genome viruses (Wang et al., 2020).

Although relatively effective, these antiviral treatments also have significant disadvantages: in the first place, the increasing emergence of viruses resistant to said antiviral compounds and, in the second place, the lack of broad spectrum antiviral activity of these compounds.

Indeed, these antiviral compounds target viral determinants and not the host cell. Due to the high frequency of mutations in influenza viruses (inherent in their polymerase which is not very faithful in terms of replication and in their segmented genome, a source of genetic reassortment among different viruses), conventional antivirals induce recurrent viral resistance.

In the case of baloxavir marboxil, several recent studies indicate that the risk of developing resistance is very high. In one phase 3 clinical study, the incidence of resistant strains was nearly 10%, mainly with A viruses (H3N2). More concerningly, the resistance rate amounted to nearly 20% in one pediatric study (Omoto et al., 2018). Moreover, one additional recent study on mutants resistant to baloxavir marboxil showed that one of the main resistance mutations (PA I38T) leads to a delay in onset of symptom reduction and a prolongation of viral shedding (Uehara et al., 2019).

Finally, some infected patients not treated with baloxavir marboxil have shed a resistant strain, which demonstrates good transmissibility between individuals of viruses resistant to baloxavir and leads to concerns of a possible large scale spread of these mutant viruses (Takashita et al., 2019). Yet the clinical impact of resistance is particularly problematic in hospitalized subjects and in immunocompromised individuals, among others.

New antiviral compounds are therefore actively sought, for purposes of limiting the appearance of these resistances. In particular, combination therapies based on combinations of at least two antiviral compounds appear particularly promising. Especially, when two antiviral compounds combined have a synergistic activity, this makes it possible to reduce the doses of active compounds used and thus to limit the risks of the appearance of resistance while ensuring a significant antiviral therapeutic effect.

Among the new antiviral compounds identified in the past few years, diltiazem can especially be mentioned, which is an active compound which acts on the host cell rather than the virus, thus making it possible to treat different viral infections.

International patent application WO 87/07508 describes the use of diltiazem for the treatment of viral infections related to cytomegalovirus or herpes.

International patent application WO 2011/066657 describes the use of diltiazem for the treatment or prevention of viral infections such as oral herpes, genital herpes and shingles.

International application WO 2016/146836 as well as the article (Pizzorno et al., 2019a) describe the use of diltiazem to treat infections with the influenza virus, possibly in combination with other antiviral agents. A combination of diltiazem and oseltamivir is proposed to treat viral influenza infections.

International application WO2019/224489 discloses in detail certain biological effects of diltiazem, which induces the expression of genes coding for type III interferons in respiratory epithelial cells. Diltiazem can thus be used in various therapeutic applications, especially for the treatment of viral and bacterial respiratory infections in respiratory and intestinal epithelia.

Thus, diltiazem is a very promising new therapeutic option for the treatment of viral infections.

However, the numerous advantages of the therapeutic use of this compound have not yet been identified. In particular, its use in combination with other antiviral agents can have surprising advantages which were not predictable.

DISCLOSURE OF THE INVENTION

The present invention relates to a combination of diltiazem and at least one viral polymerase inhibitor compound selected from among baloxavir marboxil, pimodivir, RO-7 and CC-42344.

The present invention also concerns this combination for its use as a medicament, especially in the prevention and/or treatment of a viral infection, especially of a respiratory and/or intestinal tract infection of a human or animal body and more particularly an infection by an influenza virus.

The present invention also relates to a pharmaceutical composition comprising, in a pharmaceutical vehicle, a combination of diltiazem and at least one viral polymerase inhibitor compound selected from among baloxavir marboxil, pimodivir, RO-7 and CC-42344.

The invention also concerns this pharmaceutical composition for its therapeutic use in the prevention and/or treatment of a viral infection, especially by an influenza virus.

Finally, the invention concerns a combination product comprising diltiazem and at least one viral polymerase inhibitor compound selected from among baloxavir marboxil, pimodivir, RO-7 and CC-42344, for its simultaneous, separate or sequential use in the prevention and/or treatment of a viral infection, notably by an influenza virus.

DESCRIPTION OF THE FIGURES

In the figures and their legends, for purposes of simplification, the following names and abbreviations will be used:
Dil or DIL designates diltiazem;
FAV designates favipiravir;
BLX, Bal or baloxavir designates the active form of baloxavir (baloxavir acid).

FIG. 1 represents the antiviral effects of the diltiazem+baloxavir combination on cells in culture infected by the H1N1nLuc virus.

FIG. 2 represents the antiviral effects of the diltiazem+favipiravir combination on cells in culture infected by the H1N1nLuc virus.

FIG. 3 represents the effects of treatments with diltiazem and baloxavir, as well as the combination of both compounds, on the replication of A/H1N1 virus then A/H3N2 virus in a human respiratory epithelial model.

FIG. 4 represents the effects of monotherapy treatment with diltiazem and baloxavir on the replication of baloxavir-resistant A/H1N1 I38T virus (FIGS. 4d, 4e) by comparison of their respective effects on A/H1N1 WT virus (FIGS. 4b, 4c) in a model of the human respiratory epithelium.

FIG. 4d: Viral infection by A/H1N1 I38T (baloxavir-resistant strain). Comparison during the post-infection (pi) time of the viral titration on untreated epithelia/epithelia treated with the solvent DMSO/treated with diltiazem (90 µM)/treated with baloxavir (10 nM)/treated with baloxavir (100 µM)

FIG. 4e: Viral infection by A/H1N1 I38T (baloxavir-resistant strain). Tracking of transepithelial resistance (TEER) measurements over time post-infection, on the epithelia as described above in the legend of FIG. 4d.

FIG. 5 represents the effects of treatments with diltiazem and baloxavir, as well as the combination of both compounds, on the replication of baloxavir-resistant viral strain A/H1N1 I38T on the human epithelial model.

FIG. 5a: Timeline of the experiment.

FIG. 5b: Viral infection by A/H1N1 I38T (baloxavir-resistant strain). Comparison during the post-infection (pi) time of the viral titration on untreated epithelia/epithelia treated with the solvent DMSO/treated with diltiazem (90 µM)/treated with baloxavir (10 nM)/treated with the combination of diltiazem (90 µM) and baloxavir (10 µM).

FIG. 5c: Viral infection by A/H1N1 I38T Tracking of transepithelial resistance (TEER) measurements over time post-infection, on the epithelia as described above in the legend of FIG. 5b.

FIG. 5d: Viral infection by A/H1N1 I38T (baloxavir-resistant strain). Comparison during the post-infection (pi) time of the viral titration on untreated epithelia/epithelia treated with diltiazem (90 µM)/treated with baloxavir (100 nM)/treated with the combination of diltiazem (90 µM) and baloxavir (100 µM).

FIG. 5e: Viral infection by A/H1N1 I38T Tracking of transepithelial resistance (TEER) measurements over time post-infection, on the epithelia as described above in the legend of FIG. 5d.

FIG. 6 illustrates the experiments conducted to observe the appearance of baloxavir-resistant viral strains in a standard test of successive passages of virus cells under antiviral selection pressure.

FIG. 6a: Timeline of the experiment.

FIG. 6b: The graph represents the concentrations of baloxavir and diltiazem used in different experimental arms (untreated, treatment with baloxavir, treatment with diltiazem and treatment with the diltiazem+baloxavir combination) for each cell passage, according to the experimental protocol described previously in FIG. 6a.

Figure 1A:
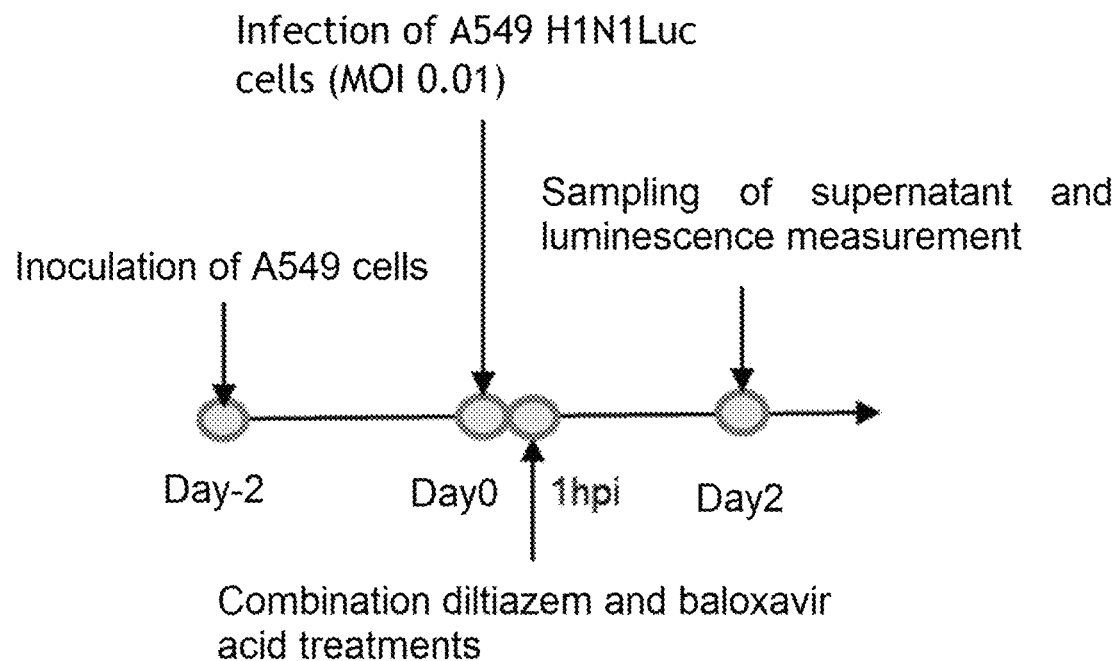
FIG. 1a: timeline of the experiment.

The table presents the limiting dilutions of the infectious supernatants resulting from each cell passage (for which significant cytopathic effects were observed) and which were used to infect MDCK cells from each subsequent cell passage in each of the four experimental arms (untreated, treatment with baloxavir, treatment with diltiazem and treatment with the diltiazem+baloxavir combination) previously described in FIG. 6a.

The following five figures illustrate the determination of the median inhibitory concentrations (IC50) of baloxavir on A/H1N1 virus resulting from the last cell passage of each of the experimental arms (untreated, treatment with baloxavir, treatment with diltiazem and treatment by the diltiazem+baloxavir combination described previously in FIG. 6a.

FIG. 6c: Determination of the median inhibitory concentrations of baloxavir on A/H1N1 virus resulting from the initial cell passage P0, in MDCK cells treated with different increasing concentrations of baloxavir. The IC50 initially determined on A/H1N1 virus used for the experiment is confirmed at 0.2 nM.

FIG. 6d: Determination of the median inhibitory concentrations of baloxavir on the virus resulting from cell passage P10 of the untreated experimental arm, in MDCK cells treated with different increasing concentrations of baloxavir. The calculated IC50 of baloxavir on A/H1N1 virus issued from the $10^{th}$ cell passage without treatment (untreated) is 0.9 nM. This slight increase can be attributed to a viral replication of A/H1N1 virus which adapted to the successive cellular amplification of MDCK cells in this experimental arm.

FIG. 6e: Determination of the median inhibitory concentration of baloxavir on the virus resulting from cell passage P10 of the diltiazem treatment experimental arm, in MDCK cells treated with different increasing concentrations of baloxavir. The calculated IC50 of baloxavir on A/H1N1 virus issued from the $10^{th}$ cell passage with diltiazem treatment is 0.3 nM. This IC50 is essentially similar to the one determined initially on the A/H1N1 virus used for the experiment.

FIG. 6f: Determination of the median inhibitory concentration of baloxavir on the virus resulting from cell passage P8 of the baloxavir treatment experimental arm, in MDCK cells treated with different increasing concentrations of baloxavir. The calculated IC50 of baloxavir on A/H1N1 virus issued from the $8^{th}$ cell passage with baloxavir treatment (in increasing concentration) is 7 nM. This IC50 is much higher than the one determined initially on A/H1N1 virus used for the experiment (IC50=0.2 nM). This increase, corresponding to 35 times the initial IC50, confirms the emergence of a virus with the baloxavir-resistance phenotype.

FIG. 6g: Determination of the median inhibitory concentration of baloxavir on the virus resulting from cell passage P6 of the diltiazem+baloxavir combination treatment experimental arm, in MDCK cells treated with different increasing concentrations of baloxavir. The calculated IC50 of baloxavir on A/H1N1 virus issued from the $6^{th}$ cell passage with diltiazem+baloxavir combination treatment (in increasing concentration) is 0.8 nM. This IC50 is very similar to the one calculated for baloxavir in A/H1N1 virus issued from the $10^{th}$ cell passage in the experimental arm without treatment (0.9 nM, see FIG. 6d) and slightly higher than the one calculated initially in A/H1N1 virus used for the experiment and resulting from cell passage P0 (IC50=0.2 nM, see FIG. 6c).

DETAILED DESCRIPTION OF THE INVENTION

The present invention relates to a combination of diltiazem and at least one viral polymerase inhibitor compound selected from among baloxavir marboxil, pimodivir, RO-7 and CC-42344.

Within the meaning of the invention, "combination" means a composition comprising at least two distinct active compounds, both compounds having an antiviral action.

This combination comprises either the same quantity by weight of each antiviral compound, i.e. a combination of 50% diltiazem and 50% viral polymerase inhibitor by weight, or unequal doses of each compound, such as 90% diltiazem and 10% viral polymerase inhibitor, 80% diltiazem and 20% viral polymerase inhibitor, 70% diltiazem and 30% viral polymerase inhibitor, 60% diltiazem and 40% viral polymerase inhibitor, 40% diltiazem and 60% viral polymerase inhibitor, 30% diltiazem and 70% viral polymerase inhibitor, 20% diltiazem and 80% viral polymerase inhibitor, or even 10% diltiazem and 90% viral polymerase inhibitor, the percentages being expressed by weight of the compound relative to the total weight of the combination.

According to a first implementation of the invention, the combination comprises diltiazem and baloxavir marboxil. More particularly, the combination consists of diltiazem and baloxavir marboxil. In one variant of the invention, the combination comprises diltiazem and baloxavir in its active form (baloxavir acid).

According to a second implementation of the invention, the combination comprises diltiazem and pimodivir. More particularly, the combination consists of diltiazem and pimodivir.

According to a third implementation of the invention, the combination comprises diltiazem and RO-7. More particularly, the combination consists of diltiazem and RO-7.

According to a fourth implementation of the invention, the combination comprises diltiazem and CC-42344. More particularly, the combination consists of diltiazem and CC-42344.

According to other implementations, the combination comprises:

- diltiazem, baloxavir marboxil and CC-42344;
- diltiazem, baloxavir marboxil and pimodivir;
- diltiazem, baloxavir marboxil and RO-7; or even
- diltiazem and all possible combinations of baloxavir marboxil, pimodivir, RO-7 and CC-42344.

Thus, the combination according to the invention comprises or consists of at least two active compounds with antiviral activity, which are described in detail below.

This combination has synergistic antiviral effects; one of its advantages is that the doses used of each antiviral compound can be reduced relative to the doses conventionally used in monotherapy. This makes it possible, on the one hand, to limit the appearance of negative side effects on the organisms treated and, on the other hand, to limit the appearance of viral resistance to said antiviral compounds.

This patent application also describes a combination of diltiazem and at least one viral polymerase inhibitor compound such as described below.

Diltiazem

Diltiazem is a molecule that is a member of the benzothiazepine family, referenced by CAS number 42399-41-7. This molecule can be in the form of two L-cis and D-cis enantiomers or in a racemic mixture.

The structural chemical formula of diltiazem hydrochloride is represented below, in formula (I):

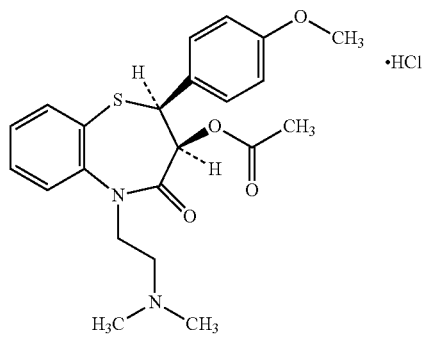 [SMILES: COc1ccc([C@@H]2Sc3ccccc3N(CCN(C)C)C(=O)[C@@H]2OC(C)=O)cc1 ; Cl]

Diltiazem has been known for more than 30 years and is approved, in Europe and the United States, by drug regulatory authorities. It can be administered in the form of diltiazem hydrochloride. Cardizem®, Cartia®, Taztia® and Dilacor® are the most common brand names.

Many formulations are available, in particular extended-release formulations. Diltiazem is available in different dosage forms, such as in the cream form for topical application, in the form of tablets or capsules for oral administration, in the form of powder for preparation of solution for injection or in the form of pharmaceutical preparations for inhalation (WO 02/094238, U.S. Pat. No. 4,605,552).

The standard dosage regimen used in humans is 180 to 360 mg/day, administered in capsule or tablet, for its therapeutic use as a calcium channel inhibitor.

The physiological property first identified for this compound is calcium channel inhibition, and therefore inhibition of the flow of intracellular calcium. Diltiazem especially inhibits the entrance of transmembrane calcium in the myocardial muscle fiber and the smooth muscle fiber of the vessels. This makes it possible to decrease the intracellular calcium concentration reaching the contractile proteins.

In humans, diltiazem administration is indicated for its vasodilator action, for purposes of reducing the cardiac workload. It is also used in treatment of cardiac and circulatory disorders such as angina pectoris, arterial hypertension, myocardial ischemia and tachycardia.

Diltiazem also acts by reversing the effects of angiotensin II, from the renal and peripheral viewpoint.

In topical application, diltiazem can be indicated in cases of chronic anal fissures.

Patent EP 1117408 describes the use of diltiazem as a calcium-channel inhibitor compound to treat pathologies related to retinal photoreceptor degeneration.

Concerning the use of diltiazem for treating viral infections, such as discussed previously, this has already been described in several patent applications. Moreover, a clinical trial is currently underway (FLUNEXT PHRC #15-0442 ClinicalTrials.gov Identifier: NCT03212716), for purposes of obtaining marketing authorisation for this new antiviral therapeutic indication.

Viral Polymerase Complex Inhibitors

The influenza virus polymerase complex is composed of 3 subunits, basic protein 1 (PB1), basic protein 2 (PB2) and acid protein (PA). This complex permits transcription and replication of the viral genome.

Antiviral treatments in development and/or having recent marketing authorisation target different subunits of this polymerase complex and act according to different mechanisms of action:
- Baloxavir marboxil is an endonuclease inhibitor mediated by the PA subunit,
- Pimodivir is an inhibitor of the PB2 subunit, and
- Favipiravir is a nucleoside analogue which inhibits RNA elongation by the polymerase complex.

The first inhibitor compound for this polymerase complex to be authorised by regulatory authorities and marketed was baloxavir marboxil. Currently, other PB2 inhibitors (pimodivir) and PB1 inhibitors (favipiravir) are respectively tested in phase 3 clinical trials or have a restricted approval.

Baloxavir Marboxil

Baloxavir marboxil (S-033188), also called baloxavir in the present application (especially in the figures), is a molecule that inhibits the cap-dependent endonuclease activity of the PA subunit of the influenza virus polymerase complex. This molecule is a prodrug which, after administration in a living organism, is metabolized into its active form "baloxavir acid" which inhibits the initiation of viral mRNA synthesis by forming stable bonds with two manganese ions in the active site of the PA subunit of the viral polymerase complex. The metabolism of the prodrug into the active metabolite is fast but the hepatic elimination of baloxavir acid is long (half-life of 50 to 90 hours) and allows oral administration of a single dose (Hayden Et Shindo, 2019). In the present application, the term "baloxavir" designates the active form "baloxavir acid" of CAS number 1985605-59-1, obtained after metabolization of the prodrug baloxavir marboxil of CAS number 1985606-14-1.

This active form is used for all in vitro experiments. The first in vitro studies showed a very good efficacy to inhibit virus influenza A (mean EC50 of 1.4 to 3.1 nM) and B (mean EC50 of 4.5 to 8.9 nM). Baloxavir has also proven effective on viruses resistant to adamantanes and to neuraminidase inhibitors (H274Y) and on different subtypes of influenza A virus arising from the avian reservoir. The combination of baloxavir and a neuraminidase inhibitor (oseltamivir) has shown a synergistic effect making it possible to protect mice from lethal infection with influenza A virus (H1N1). This combination also permits a significant reduction in the viral titer in the lungs, 24 hours after treatment initiation (Fukao et al., 2019).

Baloxavir marboxil has the potential to revolutionize treatment of flu infections given its long half-life allowing a therapeutic regime consisting of a single dose (in contrast to 5 days of treatment for oseltamivir) and an increased antiviral activity relative to neuraminidase inhibitors.

In a recent phase 3 clinical study, the median time to cessation of viral shedding in non-hospitalized influenza-infected adults was 48 h for the group treated with baloxavir marboxil, compared to 72 h for the group treated with oseltamivir, and 96 h for the placebo group, although the difference in the duration of symptoms was not significant between the 2 types of treatment (Hayden et al., 2018).

Baloxavir marboxil is very well tolerated with mainly digestive side effects (nausea, diarrhea, etc.) in 4 to 5% of patients to whom this compound was administered.

In return, one of the major disadvantages of this molecule is the rapid appearance of resistance mutations in the PA subunit of the influenza virus polymerase complex. From the first in vitro tests, virus variants have been isolated with a main substitution in amino acid 138 (I38T/M/ or phenylalanine F) of PA leading to a 10 to 100-fold reduction in sensitivity of the virus to baloxavir (Noshi et al., 2018). Clinically, although currently very rare, these substitutions can be found in the absence of antiviral treatment (Takashita et al., 2019). During clinical trials, I38T/M substitutions in PA were found in 2 to 24% of patients treated with baloxavir marboxil. Moreover, the duration of clinical signs was less reduced in patients treated with baloxavir marboxil and having a mutated virus.

Recently, the antiviral effects of baloxavir marboxil have been observed on other types of viruses with negative strand segmented RNA genome, such as severe fever with thrombocytopenia syndrome virus (SFTSV) and Heartland virus (HRTV), tick-borne pathogens. (Wang et al., 2020)

Pimodivir

Pimodivir (JNJ63623872 or JNJ-872 or VX-787) is a complex that inhibits the PB2 subunit of the influenza A virus polymerase complex by binding to the cap-binding site, preventing binding of the natural ligand 7-methyl GTP and viral mRNA synthesis (Clark et al., 2014).

Pimodivir is well tolerated with mainly digestive side effects (nausea, diarrhea, etc.) depending on the dose.

Two phase III clinical trials have been conducted during the 2017-2018 season.

As for any anti-infectious treatment, resistance mutations in PB2 have been identified in vitro and in vivo. The M431I substitution in PB2 would be responsible for a decrease in sensitivity of around 60 fold and was found in 10% of patients treated in monotherapy with pimodivir (Trevejo et al., 2018).

RO-7

RO-7 is an inhibitor of the endonuclease activity of the acidic protein PA of the influenza virus polymerase complex, discovered in 2016. This compound has a good in-vitro activity (EC50 of 1.1 to 21.6 nM) in a wide selection of influenza virus circulating in humans or present in the avian reservoir. The use of RO-7 protected mice from lethal infection with influenza virus while significantly decreasing the viral load in their lungs. Since RO-7 is structurally very similar to baloxavir marboxil, amino acid 138 substitutions of PA also lead to a reduction of influenza virus sensitivity to this molecule.

CC-42344

CC-42344 is one of the most recently identified compounds. It acts by inhibiting the activity of the PB2 subunit on the influenza virus polymerase complex. The preclinical data have not yet been published but this molecule would have good antiviral activity and could be administered orally, by IV or by inhalation.

Ribavirin

Ribavirin (Virazole) is a broad-spectrum antiviral molecule which is active against numerous DNA and RNA viruses. It is a guanosine analogue which, in its monophosphate form, inhibits inosine 5'-monophosphate dehydrogenase (IMPDH) and reduces available GTP levels. In its triphosphate form, it is incorporated into the viral RNA transcribed and thus blocks RNA elongation and has a mutagenic effect. It is therefore considered to be a viral genome replication inhibitor.

In in vitro studies, ribavirin has proven efficacious against all types of influenza virus. In return, clinical studies have concluded that ribavirin administered orally was not effective against flu virus. Moreover, the numerous side effects observed limits its use. However, several clinical trials based on a combination of ribavirin with other antiviral compounds are underway in humans.

Favipiravir

Favipiravir or T-705 is a compound used as an antiviral against RNA viruses, especially orthomyxoviruses, especially including the various influenza viruses, West Nile virus, yellow fever virus, foot and mouth disease virus, as well as other flaviviruses, arenaviruses, bunyaviruses and alphaviruses.

This molecule would act by selective inhibition of the polymerase of these viruses (Yousuke et al., 2009).

Regarding its effect on influenza virus, favipiravir has shown efficacy in MDCK cell culture, verus influenza A, B and C virus, including viruses resistant to neuraminidase inhibitors, as well as efficacy in a mouse model infected with the A/PuertoRico/8/34 strain. Favipiravir would act as a nucleoside analogue exhibiting a low cytotoxicity and able to specifically inhibit influenza virus polymerase.

In vivo, favipiravir has proven effective to protect mice infected with highly-pathogenic virus A/H5N1 sensitive or resistant to oseltamivir.

The oseltamivir and favipiravir combination has proven synergistic at certain concentrations in mice infected by type A influenza viruses.

Favipiravir-resistance mutations have been identified in influenza virus polymerase (Goldhill et al., 2018).

The therapeutic use in humans of this compounds has had marketing authorisation in Japan since 2014.

Therapeutic use of Said Combination.

According to one of its aspects, the present invention relates to a combination of diltiazem and at least one viral polymerase inhibitor compound selected from among baloxavir marboxil, pimodivir, RO-7 and CC-42344 for its use as a medicament.

The present invention especially relates to a combination of diltiazem and at least one viral polymerase inhibitor compound selected from among baloxavir marboxil, pimodivir, RO-7 and CC-42344, for its therapeutic use in the prevention and/or treatment of a viral infection, especially of the respiratory and/or intestinal tracts of a human or animal organism.

The term "prevention" means the fact of preventing or at least reducing the probability of the appearance of a viral infection in a human or animal body.

The term "treatment" means the fact of combatting viral infection in a human or animal body. This means administering a treatment for purposes of reducing the viral load within the body. The term "treatment" also means the fact of attenuating the symptoms associated with the viral infection (fever, fatigue).

Said treatment is equally applicable to human beings and animals, and particularly to farm animals such as pigs, horses and poultry.

According to a first implementation of the invention, the invention relates to a combination of diltiazem and at least one viral polymerase inhibitor compound selected from among baloxavir marboxil, pimodivir, RO-7 and CC-42344, for its therapeutic use in the prevention of a viral infection.

According to a second implementation of the invention, the invention relates to a combination of diltiazem and at least one viral polymerase inhibitor compound selected from among baloxavir marboxil, pimodivir, RO-7 and CC-42344, for its therapeutic use in the treatment of a viral infection.

According to a third implementation of the invention, the invention relates to a combination of diltiazem and at least one viral polymerase inhibitor compound selected from among baloxavir marboxil, pimodivir, RO-7 and CC-42344, for its therapeutic use in the prevention and treatment of a viral infection.

According to a preferred implementation of the invention, said combination comprises diltiazem and baloxavir marboxil.

The present invention also concerns a method for treating a patient having a viral infection, especially of the respiratory and/or intestinal tracts, comprising the administration to said patient of a combination of diltiazem and at least one viral polymerase inhibitor compound selected from the group consisting of: baloxavir marboxil, pimodivir, RO-7 and CC-42344.

The present invention also concerns a method for preventing the appearance of a viral infection, especially of the respiratory and/or intestinal tracts, in an individual susceptible of being infected by a virus, comprising the administration to said individual of a combination of diltiazem and at least one viral polymerase inhibitor compound selected from among the group consisting of: baloxavir marboxil, pimodivir, RO-7 and CC-42344.

The present invention also concerns a veterinary method for preventing and/or treating a viral infection, especially of the respiratory and/or intestinal tracts, in an infected animal or an animal susceptible of being infected, comprising the administration to said animal of a combination of diltiazem and at least one viral polymerase inhibitor compound selected from among the group consisting of: baloxavir marboxil, pimodivir, RO-7 and CC-42344.

Viral Infections and Associated Viruses

Within the meaning of the invention, "viral infection" means a disease induced by a virus having penetrated into the organism, by infecting certain cells of said organism designated as "target cells" or "host cells". A viral infection is generally diagnosed by a healthcare professional on the basis of observing the symptoms of the infected patient or animal. Additional laboratory testing may be necessary to confirm the diagnosis (testing blood and/or sputum and/or bronchoalveolar fluid and/or biological samples from the intestinal tract).

The combination according to the invention is intended to prevent and/or treat a viral infection, especially of the respiratory and/or intestinal tract of a human or animal body, in other words, an infection affecting the respiratory epithelium cells.

"Respiratory tract infection", means viral infections affecting the lungs and the respiratory tract, i.e. the passages through which the air passes through to breathe. They especially comprise the common cold, flu and bronchiolitis.

The viruses involved in viral respiratory infections include, in particular, respiratory syncytial virus (RSV), influenza viruses (flu), parainfluenza viruses, adenoviruses and rhinoviruses.

In children, the main causes of viral respiratory infections are rhinoviruses, influenza viruses, parainfluenza viruses, respiratory syncytial virus (RSV), enteroviruses, coronaviruses and some adenovirus strains.

In the context of the present invention, it will be, in particular, an acute respiratory infection (ARI).

"Intestinal tract infection" means viral infections affecting the digestive tract which especially comprises the upper and lower: the mouth, pharynx (at the intersection of the digestive and respiratory tracts), esophagus, stomach, and intestines.

The most common causes of gastroenteritis are linked to viral infections by noroviruses or rotaviruses.

According to a particular implementation, the therapeutic combination is intended for the treatment and/or prevention of an infection with an influenza virus.

Influenza viruses, responsible for flu, are divided into four types: A, B, C and D. At the surface of the virus are found two glycoproteins that play an important role in the infection of cells of the infected organisms: hemagglutinin HA and neuraminidase (NA). There are different subtypes of influenza A virus depending on the nature of the HA and NA glycoproteins on their surface: 16 types of HA and 9 types of NA have been identified in the viruses circulating in the animal world and especially among migratory seabirds. Influenza viruses can therefore be defined depending on the type of glycoproteins that they possess on their surface.

In humans, the viruses of subtype A circulating for several decades are subtypes H1N1, H2N2 and H3N2, with occasional inter-species transmissions, especially from animals to humans, of avian viruses H5N1, H7N7, H7N9, H5N2 and H9N2. As emphasized by the recent emergence of a new pandemic flu virus H1N1 of swine, avian and human origin (virus with swine, avian and human reassortment), type A influenza viruses represent a serious public health threat. Flu pandemics are especially the result of antigenic shifts that correspond to the appearance of viruses endowed with new surface glycoproteins (HA and NA) in the human population. These shifts allow direct transmission in humans of animal, and especially avian, viruses: this is the case of highly pathogenic avian H5N1 since 2003 in Asia, or epidemics of H7N7 flu in the Netherlands in 2003 and H7N9 in Southeast Asia in 2013. Moreover, seasonal flu epidemics, which are especially the result of genetic drift (appearance of mutations in surface glycoproteins) are a major cause of increased morbidity and mortality in the human population, especially in very young individuals, the elderly, immunocompromised individuals and those with cardiopulmonary diseases.

Within the meaning of the invention, "influenza virus" means type A, B, C or D flu etiological agents, and especially type A and type B influenza having humans or animals as hosts. "Flu virus" and "influenza virus" are used interchangeably in the application and designate the same viruses.

The invention especially concerns a combination of diltiazem and baloxavir marboxil for its therapeutic use in the prevention and/or treatment of an influenza virus infection. In a variant of the invention, it especially concerns a combination of diltiazem and baloxavir acid for its therapeutic use in the prevention and/or treatment of an influenza virus infection.

According to a first aspect of the invention, the combinations of the present invention are used for the prevention and/or treatment of infections by at least one type A influenza virus. Advantageously, the combinations of the present invention have a broad spectrum of action against the different subtypes of type A influenza viruses.

According to a particular aspect, the flu virus is a type A virus selected from the subtypes H1N1, H2N2, H3N2, H5N1, H7N7, H7N9, H5N2 and H9N2.

According to another aspect of the invention, the combinations of the present invention are used for the prevention and/or treatment of infections by at least one type B influenza virus.

Viral Resistance

The invention especially concerns a combination of diltiazem and at least one viral polymerase inhibitor selected from baloxavir marboxil, pimodivir, RO-7 and CC-42344, for its therapeutic use in the prevention and/or treatment of an infection with an influenza virus, said influenza virus being resistant to the inhibitory action of at least one antiviral compound, especially an anti-influenza compound, and more particularly a viral polymerase inhibitor.

Indeed, the combination according to the invention is particularly interesting in the case where the virus causing the viral infection is not sensitive or only slightly sensitive to the action of a viral polymerase inhibitor compound conventionally used, and in particular selected from among baloxavir marboxil, pimodivir, RO-7 and CC-42344.

As presented above, the major disadvantage of the therapeutic use of this family of compounds which targets viral polymerases is the development of viral strains resistant to their action, becoming insensitive to the inhibitory action of these compounds.

The advantages of the combined use of diltiazem and at least one viral polymerase inhibitor compound selected from among baloxavir marboxil, pimodivir, RO-7 and CC-42344 are as follows:
1) the emergence of viral strains resistant to at least one viral polymerase inhibitor compound is clearly limited, or even totally inhibited during combined administration with diltiazem (see Example 6);
2) diltiazem alone has an effective antiviral activity against viral strains resistant to a viral polymerase inhibitor (see Example 4, based on a baloxavir-resistant viral strain);
3) the combination of diltiazem+baloxavir marboxil has an effective antiviral activity against baloxavir-resistant viral strains due to the presence of diltiazem and a high concentration of baloxavir (see Example 5).

In particular, a combination according to the invention would comprise diltiazem and baloxavir marboxil and will be used for the treatment and/or prevention of an infection by influenza virus resistant to the inhibitory action of a viral polymerase inhibitor, for example a virus exhibiting a resistance mutation in the polymerase PB2 subunit.

According to another implementation of the invention, the combination will comprise diltiazem and baloxavir marboxil and will be used for the treatment and/or prevention of an infection with an influenza virus resistant to the inhibitory action of baloxavir marboxil. In particular, it will be an influenza A/H1N1 viral strain bearing a mutation in the polymerase PA subunit. More precisely, it will be an influenza A/H1N1 viral strain bearing a I38T point mutation in the polymerase PA subunit.

According to another implementation of the invention, the influenza virus is resistant to the inhibitory action of at least one anti-influenza compound, notably a neuraminidase inhibitor such as oseltamivir (Tamiflu®).

A variant of the invention concerns diltiazem for its therapeutic use in the prevention and/or treatment of an infection with an influenza virus, said influenza virus being resistant to the inhibitory action of at least one antiviral compound, especially an anti-influenza compound, and more particularly a viral polymerase inhibitor. In particular, this influenza virus will be resistant to one of the following compounds: baloxavir marboxil, pimodivir, RO-7, CC-42344 and a neuraminidase inhibitor, especially oseltamivir.

Other Active Agents Present in the Combination

The present invention also relates to a combination of diltiazem and at least one viral polymerase inhibitor compound selected from among baloxavir marboxil, pimodivir, RO-7 and CC-42344, also comprising another active agent, especially an antiviral and/or antibiotic agent.

According to a preferred aspect, the antiviral agent is selected from among antiviral agents well known to the skilled person and conventionally used to prevent or treat flu. Antiviral agents active on at least one influenza virus are availably commercially and described in reference works such as Le Dictionnaire Vidal. Oseltamivir can especially be mentioned. Thus, the present invention also relates to a combination of diltiazem, baloxavir marboxil and oseltamivir.

The antibiotic is selected from among antibiotics well known to the skilled person, especially those used in viral infections to prevent secondary bacterial infection and especially those of the macrolide family and, more particularly, roxithromycin.

The invention also concerns one of the combinations named above, comprising at least three active compounds, for its therapeutic use, especially in the prevention and/or treatment of a viral infection and more particularly for the prevention and/or treatment of an infection by an influenza virus.

Pharmaceutical or Veterinary Composition

The present invention also relates to a pharmaceutical composition comprising, in an appropriate pharmaceutical vehicle, a combination of diltiazem and at least one viral polymerase inhibitor compound selected from among baloxavir marboxil, pimodivir, RO-7 and CC-42344.

The present invention also relates to a veterinary composition comprising, in an appropriate pharmaceutical vehicle, a combination of diltiazem and at least one viral polymerase inhibitor compound selected from among baloxavir marboxil, pimodivir, RO-7 and CC-42344.

According to a preferred aspect, the viral polymerase inhibitor present in this pharmaceutical or veterinary composition is baloxavir marboxil.

This pharmaceutical or veterinary composition comprises an efficacious quantity of diltiazem and an efficacious quantity of viral polymerase inhibitor compound, in particular baloxavir marboxil.

Within the meaning of the invention, "efficacious quantity" means a sufficient quantity of antiviral compound to inhibit the proliferation and/or replication of the virus and/or the development of a viral infection within the organism. This inhibition can be quantified, for example by measuring viral production as presented in the examples of the present application.

For example, in vitro, the so-called "efficacious" quantities are as follows:
for diltiazem, a concentration of from 5 to 200 µM is preferred, and
for the viral polymerase inhibitor compound, and especially baloxavir (active form), a concentration of from 5 to 200 nM is preferred.

According to the invention, the term "pharmaceutical vehicle" designates one or more acceptable pharmaceutical vehicles or excipients according to the invention, i.e., vehicles or excipients whose administration to an individual or an animal is not accompanied by significant harmful effects, and which are well known to the skilled person.

The pharmaceutical or veterinary compositions according to the present invention are suitable for oral, sublingual, inhalation, subcutaneous, intramuscular, intravenous, transdermal, ocular or rectal administration.

According to a preferred aspect of the invention, the pharmaceutical composition is characterized in that it is in an appropriate dosage form for administration by inhalation.

Inhalation means absorption by the respiratory tracts. It is particularly an absorption method for compounds for therapeutic purposes, certain substances in the form of gas, micro-droplets or powder in suspension.

The administration of pharmaceutical or veterinary compositions by inhalation, i.e., by nasal and/or oral route, is well known to the skilled person.

Two types of administration by inhalation are distinguished:
   administration by insufflation when the compositions are in the form of powders, and
   administration by nebulization when the compositions are in the form of aerosols (suspensions) or in the form of solutions, for example aqueous solutions, placed under pressure. The use of a nebulizer or a sprayer will then be recommended to administer the pharmaceutical or veterinary composition.

The dosage form considered here is therefore selected from among: a powder, an aqueous suspension of droplets or a pressurized solution.

The present invention also relates to a pharmaceutical composition comprising, in an appropriate pharmaceutical vehicle, a combination of diltiazem and at least one viral polymerase inhibitor compound selected from among baloxavir marboxil, pimodivir, RO-7 and CC-42344 for its use as a medicament.

The present invention also concerns a pharmaceutical composition comprising, in a pharmaceutically-appropriate vehicle, a combination of diltiazem and at least one viral polymerase inhibitor compound selected from among baloxavir marboxil, pimodivir, RO-7 and CC-42344, for its therapeutic use in the prevention and/or treatment of a viral infection, especially of the respiratory and/or intestinal tracts of a human or animal body, more particularly an infection by an influenza virus.

Combination Product

The present invention also concerns a combination product comprising diltiazem and at least one viral polymerase inhibitor compound selected from among baloxavir marboxil, pimodivir, RO-7 and CC-42344, for its simultaneous, separate or sequential use in the prevention and/or treatment of a viral infection, especially of the respiratory and/or intestinal tracts of a human being or animal, more particularly an infection by an influenza virus.

This combination product could be used in humans or animals.

It will be particularly composed of diltiazem and baloxavir marboxil.

It can comprise other active compounds and especially oseltamivir.

EXAMPLES

In the following examples, the term baloxavir is used to designate baloxavir acid, i.e., the activated form of the compound, and not the form administered to a patient, which is a prodrug.

Example 1—The Diltiazem+Baloxavir Combination has a Synergistic Antiviral Effect Against a Recombinant H1N1nLuc Virus in the Cell System A549 cells infected with A/H1N1nLuc (multiplicity of infection (MOI) 0.01) were treated one hour post-infection with increasing concentrations of diltiazem (6 nM to 100 µM) and baloxavir acid (0.0625 nM to 1 nM), sold by Med Chem Tronica, ref. HY-109025A) alone and in combination.

Figure 1B:
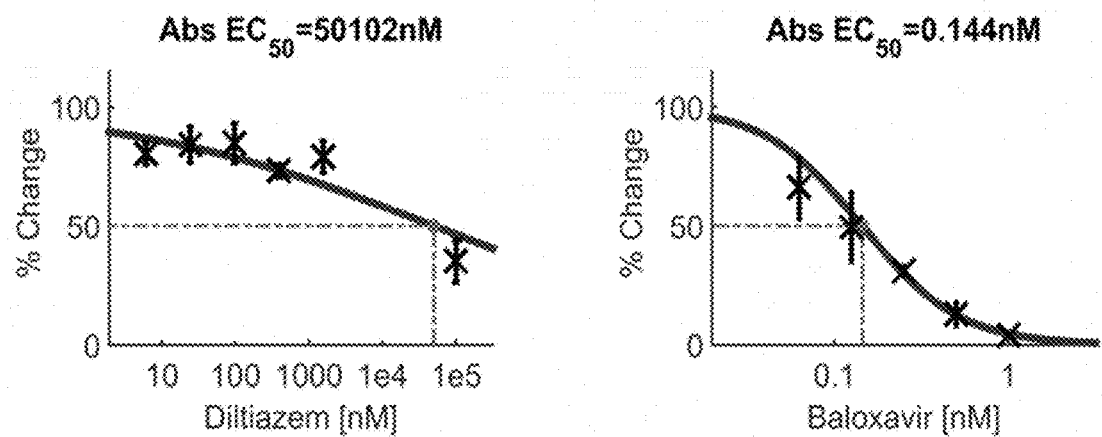
FIG. 1b: Dose-effect curves of the diltiazem and baloxavir molecules as a monotherapy in the H1N1nLuc virus (determination of EC50).

The luminescence measured in the infection cell supernatants (sampled 48 hours post-infection) reflects the level of viral replication (experiment chronogram shown in FIG. 1a). The EC50 of each of the two molecules was determined (EC50 diltiazem=50102 nM; EC50 baloxavir=0.144 nM, see FIG. 1b).

Figure 1C:
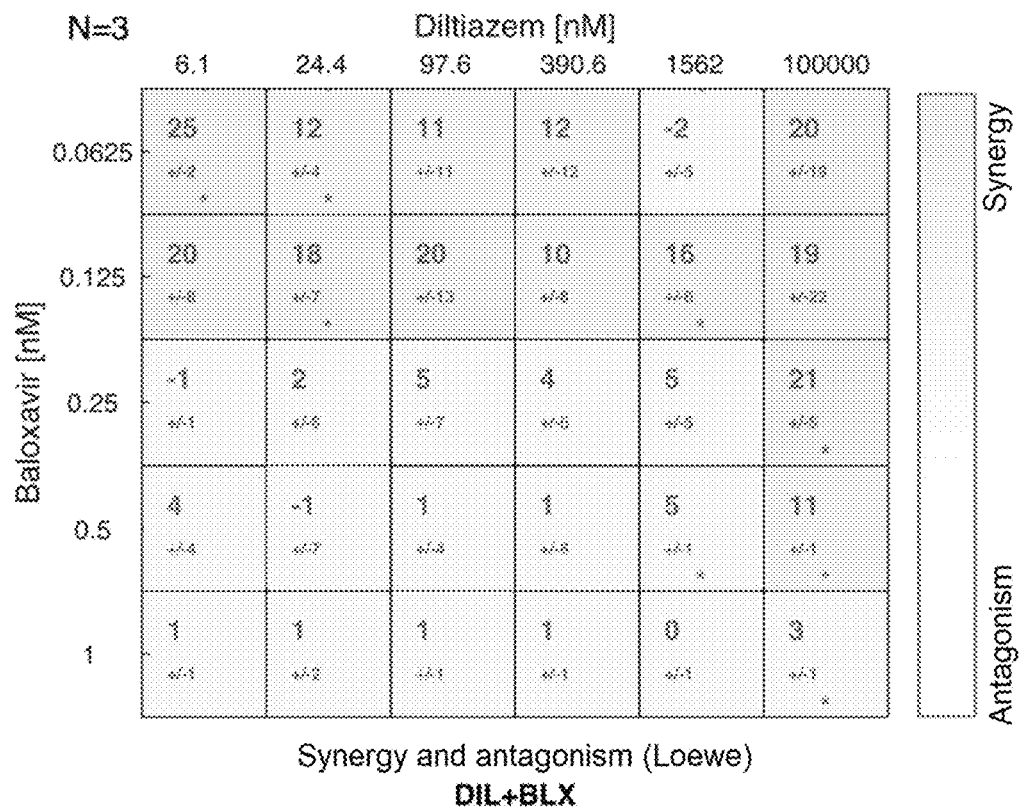
FIG. 1c: Graphical representation of the synergistic effects, depending on the concentrations used, of diltiazem (DIL) and baloxavir (BLX), in combination against a H1N1nLuc recombinant virus.

The effects of the combination of molecules were characterized by analysis via Combenefit software from the luminescence data measured (represented in the form of a table with a chromatic scale, see FIG. 1c).

The synergistic or antagonistic effect of the combination is represented by the synergy score (analyzed according to the Loewe model), with a chromatic scale to facilitate the interpretation of the results. A coefficient ≥5 (gray to dark gray) indicates a synergistic effect of the combination of molecules, while a coefficient ≤−5 (white) indicates an antagonistic effect of the combination of molecules. Coefficients between −5 and 5 indicate "non-interference" of the molecules in the combination, or even additive effects between the different treatments. Number of experiments=3.

As is shown in FIG. 1c, the combination of diltiazem and baloxavir acid exhibits synergistic effects.

Two particular conditions are particularly synergistic:
(i) conditions associating a high concentration of diltiazem (1562 nm) with baloxavir acid concentrations near its IC50 (0.1 nM);
ii) the conditions associating lower concentrations of diltiazem (less than 25 nM) with very small doses of baloxavir acid (less than 0.1 nM).

Under all the conditions tested of concentrations in combination, no antagonistic effect was observed.

The results show that the combination of diltiazem and the active form of baloxavir permits a very significant and synergistic reduction in viral replication (especially under conditions of use of low doses of baloxavir, which is an advantage in terms of reducing the risk of appearance of baloxavir resistance mutation) in A549 cells compared with monotherapy treatment with each of the two molecules alone, at the same concentrations.

Example 2—the Diltiazem+Favipiravir Combination is Synergistic or Antagonistic, Depending on the Concentrations of Each of the Two Molecules in a Recombinant H1N1nLuc Virus in the Cell System A549 cells infected with A/H1N1nLuc (MOI 0,01) were treated one hour post-infection with increasing concentrations of diltiazem (6 nM to 100 µM) and favipiravir (6 nM to 100 µM) alone and in combination.

Figure 2A:
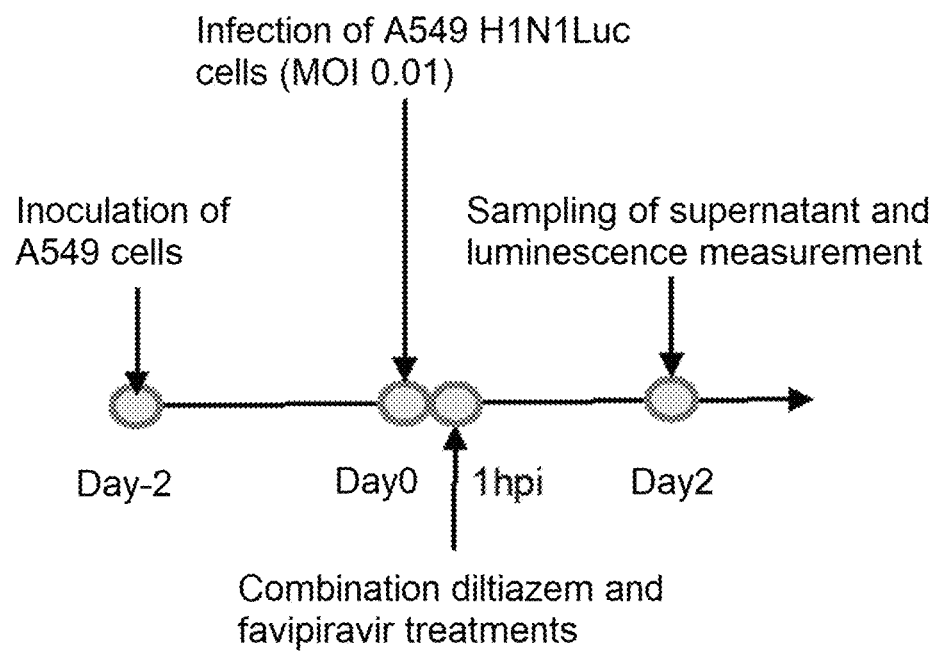
FIG. 2a: timeline of the experiment

The luminescence measured in the infection cell supernatants (sampled 48 hours post-infection) reflects the level of viral replication (experiment chronogram shown in FIG. 2a).

Figure 2B:
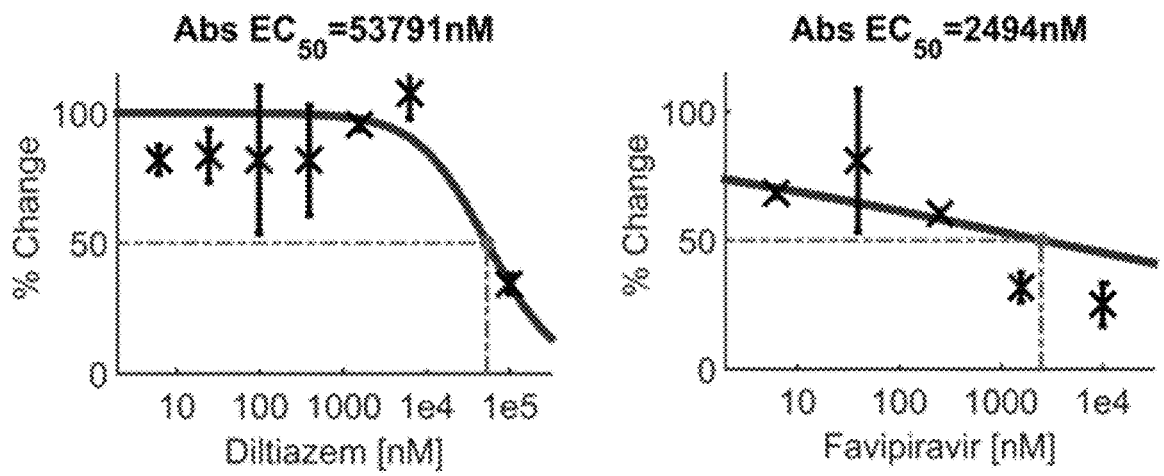
FIG. 2b: Dose-effect curves of diltiazem and favipiravir as a monotherapy in the H1N1nLuc virus (determination of EC50).

The EC50 of each of the molecules was determined (EC50 diltiazem=53791 nM; EC50 favipiravir=2494 nM, see FIG. 2b).

Figure 2C:
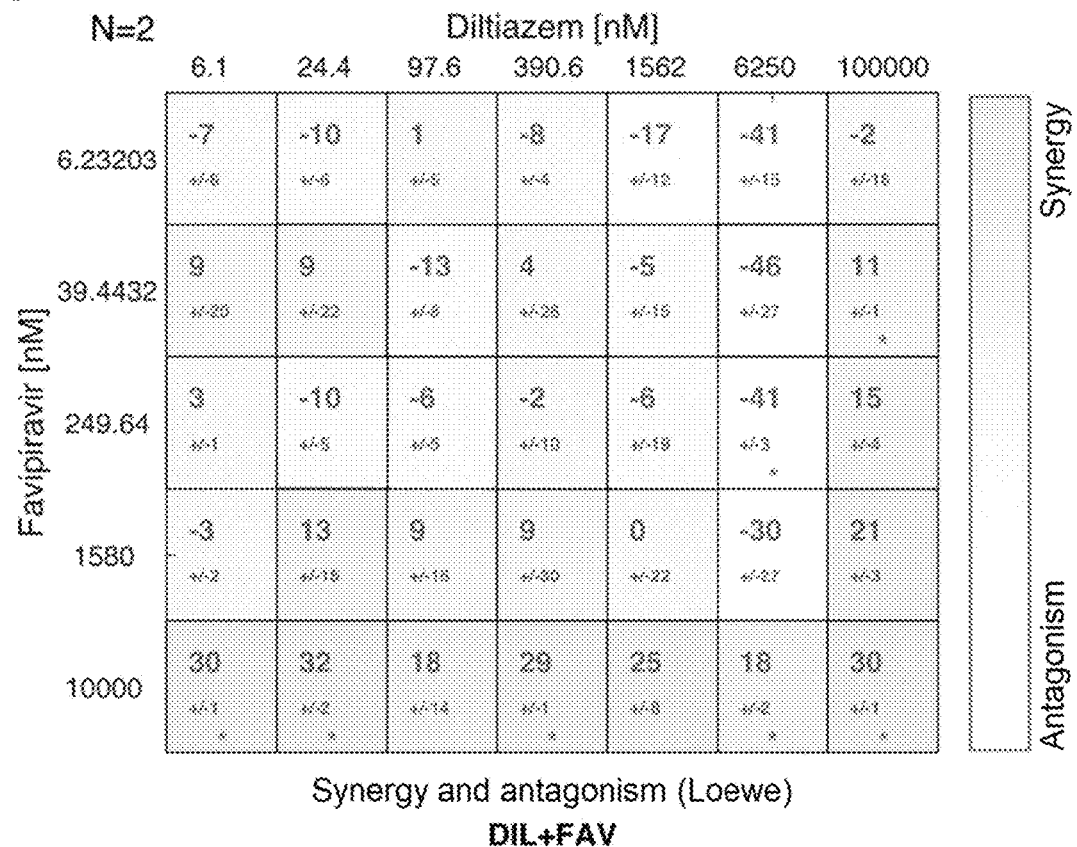
FIG. 2c: Graphical representation of the synergistic or antagonistic effects, depending on the concentrations used, of diltiazem (DIL) and favipiravir (FAV), in combination against an H1N1nLuc recombinant virus.

The effects of the combination of molecules were characterized by analysis via Combenefit software from the luminescence data measured (represented in the form of a table with a chromatic scale, see FIG. 2c).

The synergistic or antagonistic effect of the combination is shown by the synergy score, with a chromatic scale to facilitate the interpretation of the results. A coefficient 5 (gray to dark gray) indicates a synergistic effect of the combination of molecules, while a coefficient ≤−5 (white) indicates an antagonistic effect of the combination of molecules. Coefficients between −5 and 5 indicate "non-interference" of the molecules in the combination, or even additive effects between the different treatments. Number of experiments=3.

The results obtained show that the combination of these two molecules (diltiazem+favipiravir) can improve the antiviral effect but, generally, do not allow a significant reduction of the treatment doses.

Depending on the concentration of the different diltiazem and favipiravir molecules, their combinations are associated with very heterogeneous effects. To obtain a synergistic effect, it is necessary to use large doses of favipiravir (greater than 1580 nM, which is a disadvantage since it favors an increase in the risk of onset of favipiravir resistance) with different doses of diltiazem (from 6 nm to 100 µM).

Moreover, under certain conditions, the effect of the combination of the two molecules can be antagonistic. These antagonistic effects are observed when the doses of diltiazem used are high (6250 nM)

The diltiazem+baloxavir combination makes it possible to obtain homogeneous results even when changing the concentrations used, unlike the diltiazem+favipiravir combination which is therefore not preferred.

Example 3. Synergy of the Diltiazem+Baloxavir Combination in a Human Respiratory Epithelium Model The reduction of replication of A/H1N1 virus and A/H3N2 virus is significantly greater with the treatment by the diltiazem+baloxavir (active form) combination in comparison to monotherapy treatments with diltiazem or baloxavir alone.

Figure 3A:
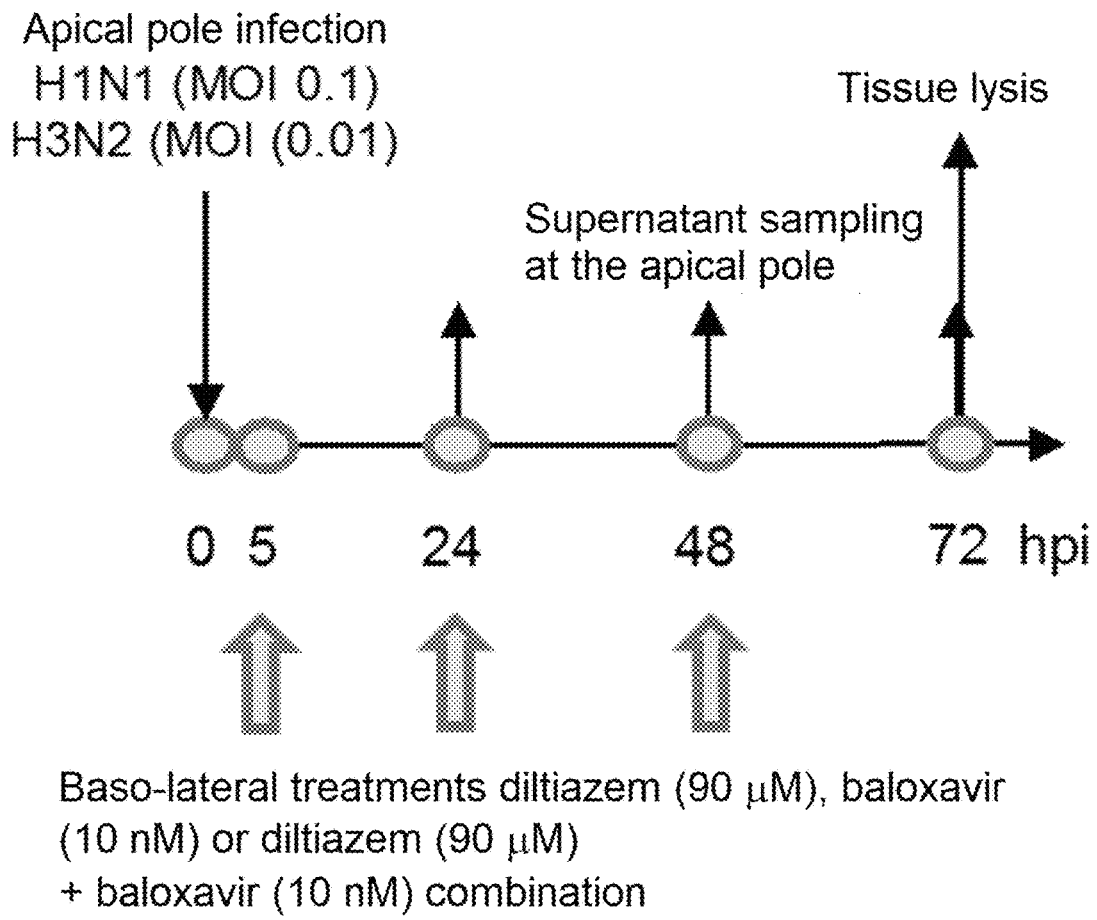
FIG. 3a: timeline of the experiment.

Reconstituted human respiratory epithelia (of nasal origin) (MucilAir® HAE, Epithelix) cultured at the air-liquid interface (according to the instructions of the supplier, Epithelix), were infected with prototype (non-recombinant) influenza viruses of type A/H1N1 pdm09 (A/Lyon/969/2009 H1N1) (MOI 0.1) or A/H3N2 (A/Texas/50/2012 H3N2) (MOI 0.01), then treated or not (untreated) with diltiazem (90 µM), baloxavir (10 nM) or a combination of diltiazem (90 µM) and baloxavir (10 nM) delivered 5, 24 and 48 hours post-infection (hpi), respectively (experiment chronogram shown in FIG. 3a).

Samples from the apical pole of infected epithelia, treated or not, were taken at 24, 48 and 72 hpi to measure viral replication by infectious titration in TCID50/mL in MDCK cells.

Figure 3B:
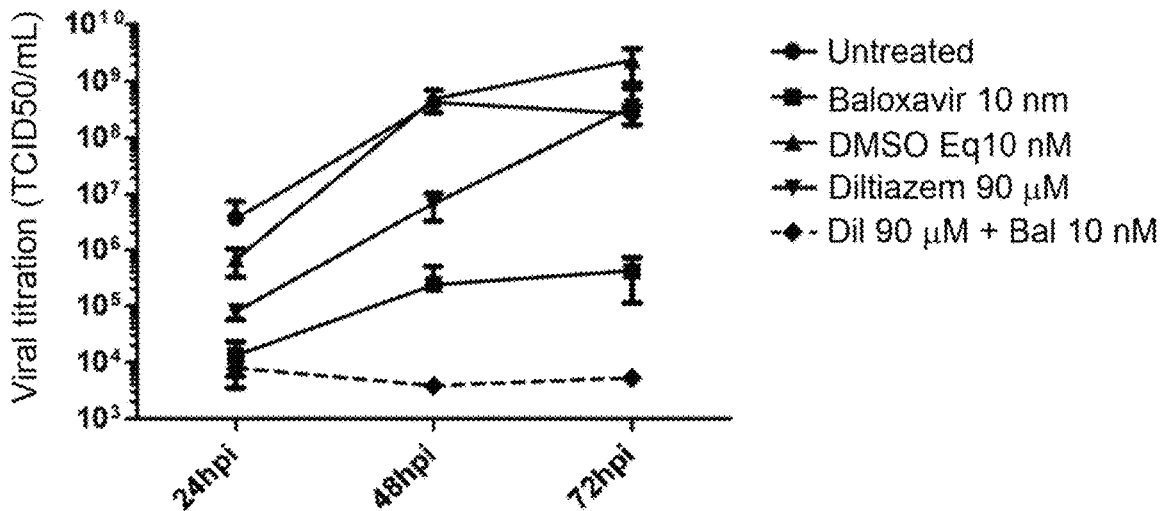
FIG. 3b: Viral infection by A/H1N1 Comparison during the post-infection (pi) time of the viral titration on untreated epithelia/epithelia treated with the solvent DMSO/treated with diltiazem (90 µM)/treated with baloxavir (10 nM)/treated with the combination of diltiazem (90 µM) and baloxavir (10 µM)
Figure 3C:
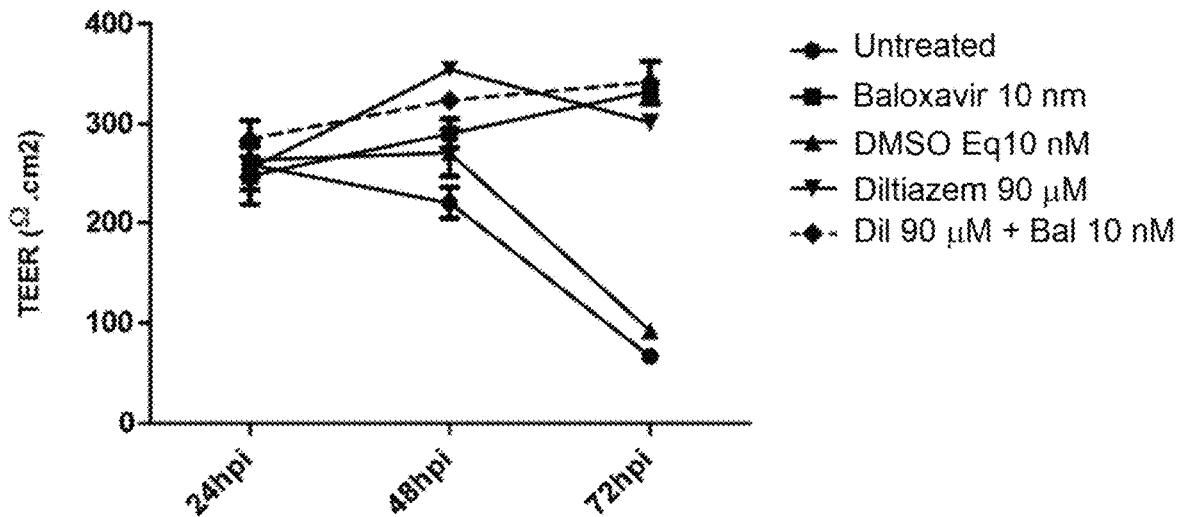
FIG. 3c: Viral infection by A/H1N1 Tracking of transepithelial resistance (TEER) measurements during the post-infection (pi) time, on the epithelia as described above in the legend of FIG. 3b.
Figure 3D:
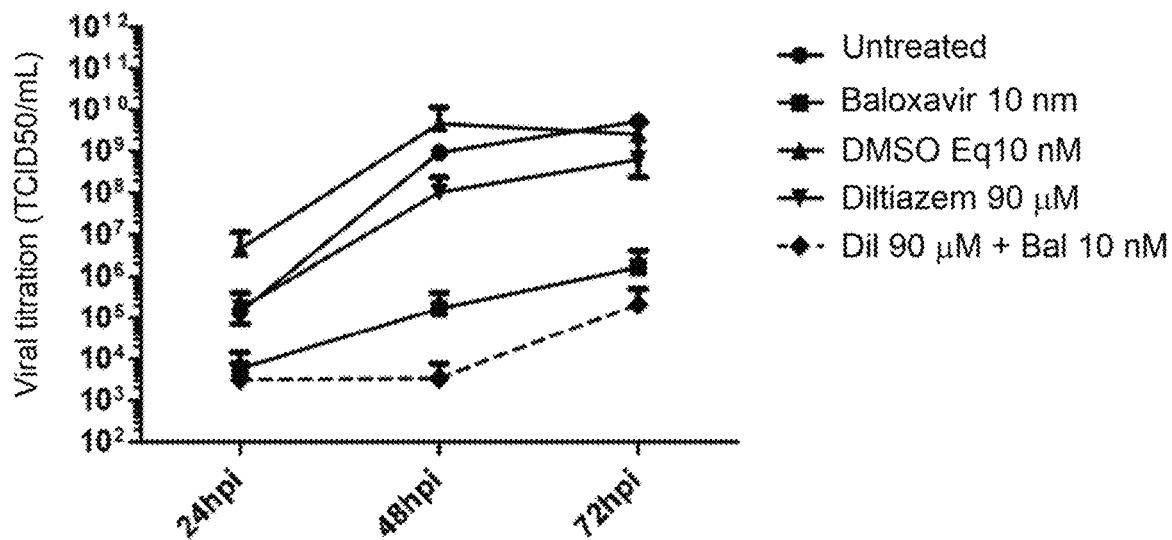
FIG. 3d: Viral infection by A/H3N2 Comparison during the post-infection (pi) time of the viral titration on untreated epithelia/epithelia treated with the solvent DMSO/treated with diltiazem (90 µM)/treated with baloxavir (10 nM)/treated with the combination of diltiazem (90 µM) and baloxavir (10 µM)
Figure 3E:
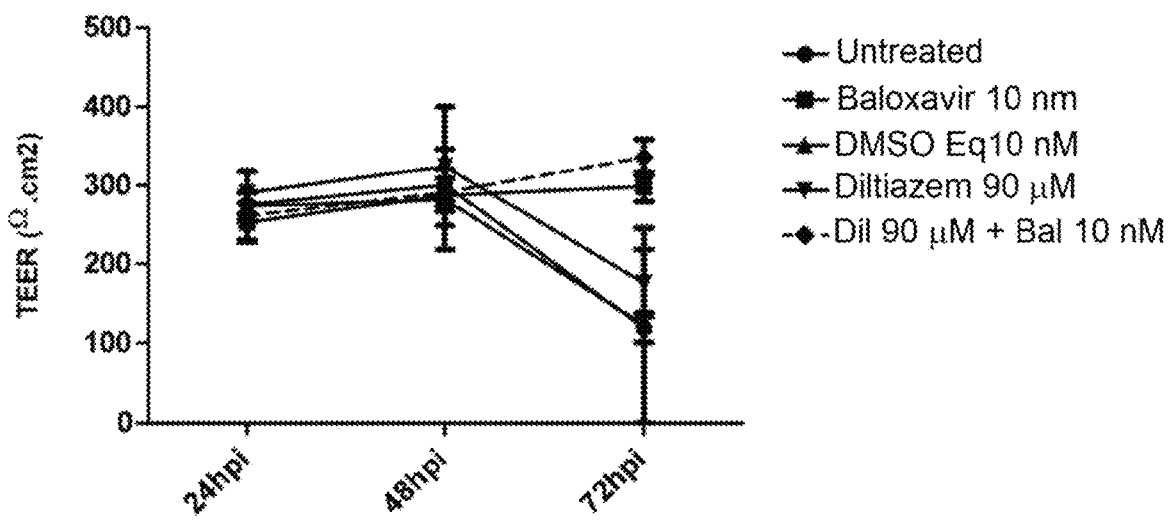
FIG. 3e: Viral infection by A/H3N2 Tracking of transepithelial resistance (TEER) measurements during the post-infection (pi) time, on the epithelia as described above in the legend of FIG. 3d.

Before each sampling at the apical pole, transepithelial resistance (physiological marker of epithelial integrity) was also measured using the EVOM2 device and the STX2 probe (World Precision Instruments) (FIGS. 3c and 3e).

As illustrated in FIG. 3b, without treatment (untreated) viral infection induces a production of A/H1N1 infectious particles with titers greater than $10^8$ TCID50/mL from 48 h post-infection.

Diltiazem treatment (90 µM) allows reducing the production of A/H1N1 infectious particles to 2 log 10 at 48 h post-infection and at least 1 log 10 at 72 h post-infection.

Baloxavir treatment has a substantial in vitro antiviral activity with a reduction to 4 log 10 of the production of A/H1N1 infectious particles at 48 h post-infection, while its solvent alone (DMSO) has no impact on infection.

The combination of diltiazem and baloxavir molecules significantly improves the antiviral effect relative to monotherapy treatments, with a reduction of A/H1N1 viral production of close to 6 log 10 at 48 and 72 h post-infection.

FIG. 3c shows the tracking of transepithelial resistance (TEER) measurements during infection of epithelia by A/H1N1, as described in FIG. 3a. It shows a substantial drop in the integrity of untreated epithelia or those treated by the control solvent DMSO at 48 h and 72 h post-infection, in correlation with a very efficient infection, such as presented in FIG. 3b.

In return, treatment with diltiazem allows maintaining the integrity of epithelia infected with TEER values that remain stable, in correlation with an antiviral effect demonstrated by infectious titration (FIG. 3b).

Treatment with baloxavir also makes it possible to maintain the integrity of infected epithelia with TEER value measurements similar to those obtained with the diltiazem treatment.

Likewise, the integrity of infected epithelia is also maintained with treatment by the combination of both molecules, in correlation with its antiviral efficacy (FIG. 3b).

These TEER measurements also confirm an absence of cytotoxic effect of the treatment by diltiazem and baloxavir in combination.

As illustrated in FIG. 3d, without treatment (untreated) A/H3N2 viral infection of the epithelia induces a production of infectious particles with titers greater than $10^9$ TCID50/mL from 48 h post-infection.

Diltiazem treatment (90 µM) allows reducing the production of A/H3N2 infectious particles to 2 log 10 at 48 h post-infection and at least 1 log 10 at 72 h post-infection.

Baloxavir treatment has a substantial in vitro antiviral activity with a reduction to 3 log 10 of the production of A/H3N2 infectious particles 48 h post-infection, while its solvent alone (DMSO) has no impact on infection.

The combination of diltiazem and baloxavir molecules significantly improves the antiviral effect relative to monotherapy treatments, with a reduction of A/H3N2 viral production of close to 5 log 10 at 48 and 72 h post-infection.

Tracking of transepithelial resistance (TEER) measurements during infection of the epithelia by A/H3N2, as described in FIG. 3a, presented in FIG. 3e, shows a significant drop in the integrity of untreated epithelia or epithelia treated with the control solvent DMSO at 48 h and 72 h post-infection, correlated with a very efficient infection, as measured and presented in FIG. 3d.

In return, treatment with diltiazem allows maintaining the integrity of epithelia infected by A/H3N2 with TEER values that remain stable up to 48 h post-infection, in correlation with an antiviral effect demonstrated by infectious titration (FIG. 3d).

Treatment with baloxavir also makes it possible to maintain the integrity of epithelia infected by A/H3N2 with TEER value measurements similar to those obtained with the diltiazem treatment at 48 h post-infection.

Likewise, the integrity of epithelia is also maintained with treatment by the combination of both molecules, in correlation with its antiviral efficacy (FIG. 3d).

These TEER measurements also confirm an absence of cytotoxic effect on the epithelia of the treatment by diltiazem and baloxavir in combination.

In conclusion, FIGS. 3b and 3d demonstrate a significant antiviral effect of the treatments with diltiazem or baloxavir in comparison to the condition of infection without treatment. The results also indicate the beneficial/synergistic effect of a diltiazem+baloxavir treatment compared to monotherapy treatments with each of the two molecules alone at the same concentrations: the combination actually allows a significantly greater reduction of viral replication compared to monotherapy treatments in the human respiratory epithelia model.

Example 4—Diltiazem has an Efficacious Antiviral Activity Against an I38T Recombinant A/H1N1 Virus Resistant to Baloxavir, in a Reconstituted Human Respiratory Epithelium Model, Comparable to its Antiviral Activity Against the Wildtype (WT) Recombinant A/H1N1 Virus in the Same Epithelium Model The resistant A/H1N1 virus was generated by reverse genetics. It bears the I38T resistance mutation in the PA subunit of its polymerase.

Reconstituted human respiratory epithelia (MucilAir® HAE, Epithelix) of nasal origin, maintained in culture in an air-liquid interface according to the instructions of the supplier, Epithelix, were infected with recombinant influenza viruses of type A H1N1 pdm09 of wildtype (WT, MOI 0.1) or resistant to baloxavir (I38T mutation on the PA subunit of the viral polymerase) (I38T, MOI 0.1).

Figure 4A:
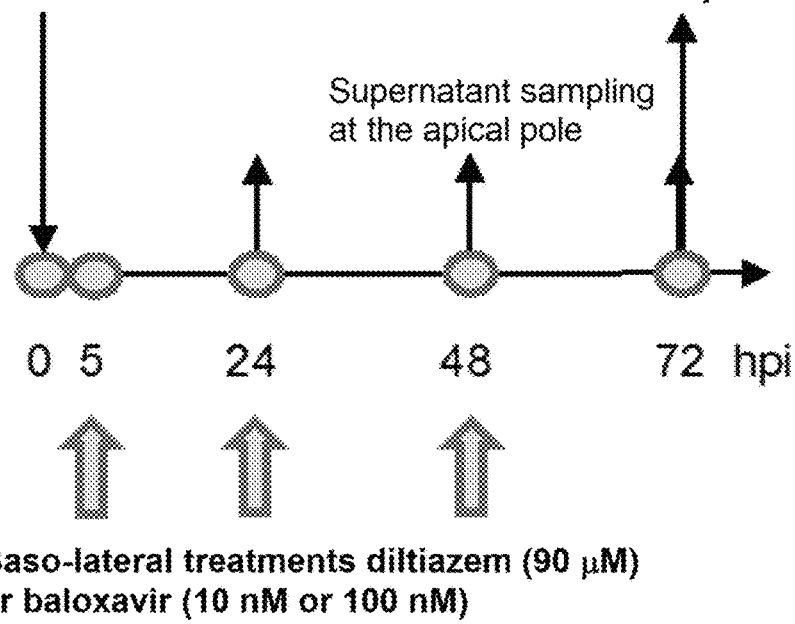
FIG. 4a: Timeline of the experiment.

These epithelia were then treated or not (untreated) with 3 successives doses of diltiazem (90 µM) alone, baloxavir alone at a concentration of 10 nM or 100 nM, or by a combination of both molecules (diltiazem at 90 µM and baloxavir at 10 nM or 100 nM), delivered at 5, 24 and 48 hours post-infection (hpi), respectively (experiment chromogram shown in FIG. 4a).

Samples from the apical pole of infected epithelia, treated or not, were taken at 24, 48 and 72 hpi to measure viral replication by infectious titration in TCID50/mL in MDCK cells.

Before each sampling at the apical pole, transepithelial resistance (physiological marker of epithelial integrity) was also measured using the EVOM2 device and the STX2 probe (World Precision Instruments).

Each experimental condition was conducted in duplicate (n=2). The graphs show the mean and standard deviation values that have been generated via the GraphPad software.

Figure 4B:
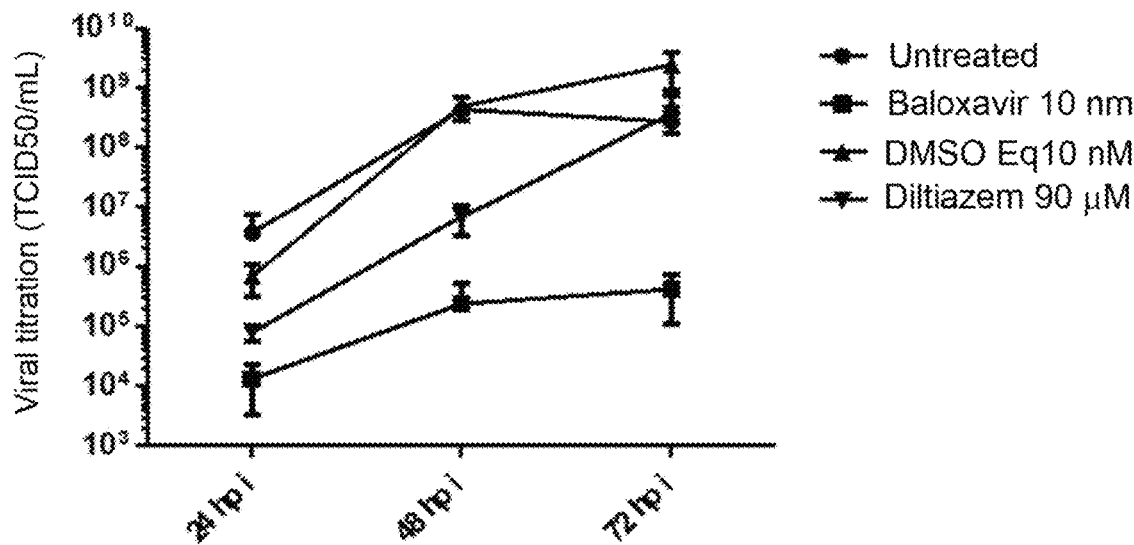
FIG. 4b: Viral infection by A/H1N1 Comparison during the post-infection (pi) time of the viral titration on untreated epithelia/epithelia treated with the solvent DMSO/treated with diltiazem (90 µM)/treated with baloxavir (10 nM).

FIG. 4b illustrates the fact that without treatment (untreated) the viral infection induces a production of A/H1N1 WT infectious particles with titers greater than $10^8$ TCID50/mL from 48 h post-infection.

Diltiazem treatment (90 µM) allows reducing the production of A/H1N1 infectious particles to 2 log 10 at 48 h post-infection and 0.5 log 10 at 72 h post-infection.

Baloxavir treatment has a substantial in vitro antiviral activity with a reduction to 3 log 10 of the production of A/H1N1 infectious particles 48 h post-infection, while its solvent alone (DMSO) has no significant impact on infection.

Figure 4C:
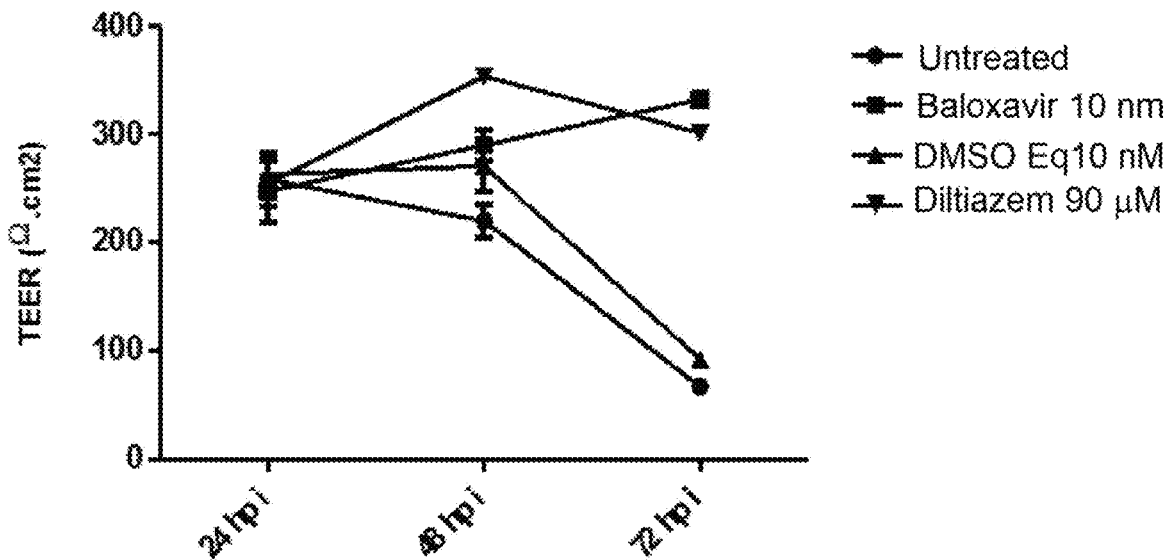
FIG. 4c: Viral infection by A/H1N1 Tracking of transepithelial resistance (TEER) measurements over time post-infection, on the epithelia as described above in the legend of FIG. 4b.

Tracking of transepithelial resistance (TEER) measurements during infection, presented in FIG. 4c, shows a significant drop in the integrity of untreated epithelia or epithelia treated with the control solvent DMSO at 48 h and 72 h post-infection, correlated with a very efficient infection, as presented in FIG. 4b.

In return, treatment with diltiazem allows maintaining the integrity of epithelia infected by A/H1N1 with TEER values that remain stable up to 48 h post-infection, in correlation with an antiviral effect demonstrated by infectious titration (FIG. 4b).

Treatment with baloxavir also makes it possible to maintain the integrity of epithelia infected by A/H1N1 with stable TEER value measurements at 48 h and 72 h post-infection.

FIG. 4d illustrates the fact that without treatment (untreated) the epithelial infection with the baloxavir-resistant A/H1N1 I38T virus induces a production of infectious particles with titers close to $10^8$ TCID50/mL at 48 h post-infection (see FIG. 4d).

Treatment with baloxavir at 10 nM has no antiviral effect on this resistant A/H1N1 I38T virus in the infected epithelium model. It is necessary to greatly increase the treatment dose with baloxavir (100 nM) to obtain an antiviral activity that still remains limited, however, against this resistant A/H1N1 I38T virus (reduction of 1 log 10 of the production of infectious particles at 48 h post-infection and 1.5 log 10 at 72 h post-infection).

In return, treatment with diltiazem (90 µM) alone allows significantly reducing the production of A/H1N1 I38T infectious particles to nearly 2 log 10 at 48 h post-infection and nearly 2 log 10 at 72 h post-infection.

Tracking of transepithelial resistance (TEER) measurements during infection by A/H1N1 I38T, illustrated in FIG. 4e, shows a significant drop in the integrity of untreated epithelia at 48 h and 72 h post-infection, correlated with a very efficient infection, as presented in FIG. 4d.

In contrast, treatment with diltiazem allows maintaining the integrity of epithelia infected by A/H1N1 I38T virus with TEER values that remain stable at 48 h and 72 h post-infection, in correlation with an antiviral effect demonstrated by infectious titration (FIG. 4d).

In contrast, treatment with baloxavir at 10 nM does not allow maintaining the integrity of epithelia infected by A/H1N1 I38T at 48 h and 72 h post-infection, consistent with the lack of antiviral activity as reported in (FIG. 4d). Only treatment with high-dose baloxavir (100 nM), for which a significant antiviral activity against the resistant A/H1N1 I38T virus has been reported in FIG. 4d, allows maintaining the integrity of the epithelium, as reported by the measurements of stable values of TEER at 48 h and 72 h post-infection.

Example 5—The Diltiazem+Baloxavir Combination Induces a Significantly Greater Reduction of Replication of Baloxavir-Resistant A/H1N1 I38T Virus Compared to Monotherapy Treatments but Only when Baloxavir is Used at High Dose Reconstituted human respiratory epithelia (MucilAir® HAE, Epithelix) of nasal origin, maintained in culture in an air-liquid interface according to the instructions of the supplier, Epithelix, were infected with recombinant influenza viruses of type A H1N1 pdm09 resistant to baloxavir (I38T mutation on the PA subunit of the viral polymerase) (I38T, MOI 0.1).

These epithelia were then treated or not (untreated) with 3 successives doses of diltiazem (90 µM) alone, baloxavir alone at a concentration of 10 nM or 100 nM, or by a combination of both molecules (diltiazem at 90 µM and baloxavir at 10 nM or 100 nM), delivered at 5, 24 and 48 hours post-infection (hpi), respectively (experiment chromogram shown in FIG. 5a).

Samples from the apical pole of infected epithelia, treated or not, were taken at 24, 48 and 72 hpi to measure viral replication by infectious titration in TCID50/mL in MDCK cells.

Before each sampling at the apical pole, transepithelial resistance (physiological marker of epithelial integrity) was also measured using the EVOM2 device and the STX2 probe (World Precision Instruments).

FIG. 5b shows the fact that without treatment (untreated) the infection of the epithelia with the baloxavir-resistant A/H1N1 I38T virus induces a production of infectious particles with titers close to $10^8$ TCID50/mL at 72 h post-infection. Diltiazem treatment (90 µM) allows reducing the production of A/H1N1 I38T infectious particles to 2 log 10 at 48 h post-infection and at least 2 log 10 at 72 h post-infection.

In return, baloxavir treatment (10 nM) is ineffective as is its solvent alone (DMSO) which has no impact on the infection.

The combination of the two molecules, diltiazem and baloxavir, at their respective concentration makes it possible to reduce the production of A/H1N1 I38T infectious particles but with no additional or synergistic effect relative to treatment with diltiazem alone at 48 h and 72 h post-infection.

This result is different from the one obtained on the A/H1N1 WT virus (not resistant to baloxavir, see FIG. 3b) on which the combination of the two molecules, diltiazem and baloxavir, at the same concentrations has a synergistic antiviral effect compared to monotherapy treatments, by especially inducing a reduction in viral production of nearly 6 log10 at 48 and 72 h post-infection.

Tracking of transepithelial resistance (TEER) measurements during infection, presented in FIG. 5c, shows a significant drop in the integrity of untreated epithelia or epithelia treated with the control solvent DMSO at 48 h and 72 h post-infection, correlated with a very efficient infection, as presented in FIG. 5b.

In return, treatment with diltiazem allows maintaining the integrity of epithelia infected by A/H1N1 I38T with TEER values that remain stable at 48 h and 72 h post-infection, in correlation with an antiviral effect demonstrated by infectious titration (FIG. 5b).

Treatment with baloxavir (10 nM) does not allow maintaining the integrity of epithelia infected by A/H1N1 I38T, consistent with its antiviral inefficacy, as reported in (FIG. 5b).

Also consistent with its significant antiviral efficacy, the diltiazem+baloxavir combination is associated with stable TEER measurements at 48 h and 72 h post-infection.

FIG. 5d illustrates the fact that without treatment (untreated) the epithelial infection with the baloxavir-resistant A/H1N1 I38T virus induces a production of infectious particles with titers close to $10^8$ TCID50/mL at 48 h post-infection.

Diltiazem treatment (90 µM) allows reducing the production of A/H1N1 I38T infectious particles over 2 log 10 at 48 h post-infection.

Used at a high concentration (100 nM), treatment with baloxavir reduced the production of A/H1N1 I38T infectious particles by approximately 1 log 10 at 48 hours post-infection, while treatment at a concentration of 10 nM had no effect on the resistant virus I38T (see FIG. 5b).

The combination of the two molecules, diltiazem and baloxavir, at the same respective concentrations further reduces the production of A/H1N1 I38T infectious particles at 48 h and especially at 72 h post-infection (with a reduction of up to 3 log 10 of A/H1N1 I38T infectious particles) compared to monotherapy treatments. The gain of the diltiazem combination with baloxavir (at high concentration=100 nM) is therefore significant versus the resistant A/H1N1 I38T virus in the human respiratory epithelium model.

This combination is particularly relevant against baloxavir-resistant viral strains, against which it is necessary to significantly increase the baloxavir doses.

Tracking of transepithelial resistance (TEER) measurements during infection, presented in FIG. 5e, shows a significant drop in the integrity of untreated epithelia at 48 h and 72 h post-infection, correlated with a very efficient infection, as presented in FIG. 5d.

In return, treatments with diltiazem or baloxavir at high dose (100 nM) allow maintaining the integrity of epithelia infected by A/H1N1 I38T with TEER values that remain stable at 48 h and 72 h post-infection, in correlation with antiviral effects demonstrated by infectious titration (FIG. 5d).

Also consistent with its significant antiviral efficacy (see FIG. 5d), the diltiazem+baloxavir combination is associated with stable TEER measurements at 48 h and 72 h post-infection.

In conclusion, the results obtained and presented in Examples 4 and 5:

(i) confirm the baloxavir resistance phenotype of the recombinant A/H1N1 I38T virus (I38T mutation in its PA subunit of polymerase), against which the reference treatment baloxavir at 10 nM has no efficacy (FIG. 4d).

(ii) FIG. 4d also demonstrates that it is necessary to greatly increase the baloxavir treatment dose (100 nM) to obtain an antiviral activity, which remains limited, however, versus this resistant A/H1N1 I38T virus.

(iii) Significantly, the results also indicate that diltiazem has a significantly efficacious antiviral activity against an I38T recombinant A/H1N1 virus resistant to baloxavir in a reconstituted human respiratory epithelium model, in comparison to its antiviral activity against the wildtype (WT) recombinant A/H1N1 virus in the same epithelium model (compare FIGS. 4b and 4d).

(iv) The results presented in FIG. 5b again confirm that combined treatment with diltiazem (90 µM) and baloxavir (10 nM) allows a significant reduction in viral replication in the respiratory epithelia of the upper airways infected with a wildtype strain of A/H1N1.

(v) In return, this combination of diltiazem (90 µM) +baloxavir (10 nM) does not provide any additional gain relative to treatment with diltiazem in monotherapy against resistant A/H1N1 I38T virus (FIG. 5b).

(vi) It is in combination with baloxavir at 100 nM that diltiazem (90 µM) provides a significant gain in terms of antiviral activity against the resistant A/H1N1 I38T virus compared to monotherapy treatments of each of the two molecules at the same concentrations in the same human respiratory epithelium model (FIG. 5d).

Example 6—the Use of Diltiazem in Combination with Baloxavir Makes it Possible to Prevent the Emergence of Baloxavir-Resistant Virus in a Standard Test of Successive Cell Passages of Viruses Under Antiviral Selection Pressure (Increasing Concentration of Baloxavir)

MDCK cells in 24-well plates were infected with the prototype A/H1N1 WT virus (for which the median inhibitory concentrations (IC50) of baloxavir and diltiazem are 0.2 nM and 5 µM, respectively) at an MOI of 0.001, thus constituting the first cell passage of the virus (P0).

Four different arms of successive cell passages of this virus were conducted under conditions with or without selection pressure, such as defined below:
- (i) without treatment (NT),
- (ii) treatment with diltiazem (Dil) at a fixed concentration of 25 µM,
- (iii) treatment with baloxavir at increasing concentrations from 1 nM up to 128 nM and
- (iv) treatment with diltiazem (Dil) at a fixed concentration of 25 µM in combination with baloxavir at the same increasing concentrations from 1 nM up to 128 nM as previously in (iii).

From the passage P0, the cells have been treated at 1 h post-infection according to the different conditions described previously or not treated (NT) and the infection supernatants were sampled at 48 h post-infection (D +2) These infectious samples were serially diluted (from $10^{-1}$ to $10^{-6}$) and each dilution was deposited on MDCK cells in a 24-well plate, thus constituting the cell passage (P1) following the passage P0.

One hour after this infection, the cells were treated according to the different conditions described previously or untreated (NT). At the end of this cell passage P1 (48 hours post-infection, D +4), and for each of the treatment arms (I, ii, iii and iv), the supernatant of the infected well was taken with the so-called "limiting" dilution, i.e., the last of the dilutions of $10^{-1}$ to $10^{-6}$ resulting from P0 where significant cytopathic effects (CPE) were observed.

These infection supernatants were serially diluted (from 10-1 to 10-6) and each dilution was deposited on MDCK cells in a 24-well plate, thus constituting the cell passage (P2) following the passage P1.

The procedure was followed in this way for each successive cell passage. The diltiazem concentration remained fixed throughout the experiment. The baloxavir concentration was fixed at 1 nM during the first two passages (P0 and P1), then was doubled during the next two passages (P3 and P4), before being doubled at each passage up to 128 nM at the tenth passage. (see chronogram of the experiment FIG. 6a).

At the end of the experiment, the infectious supernatants resulting from the last cell passage of each treatment arm exhibiting significant CPE were titrated by TCID50/mL in MDCK cells. The median inhibitory concentration of baloxavir on the viruses of these supernatants was also calculated by a method of titration in limiting dilution in TCID50/mL in MDCK cells, in order to characterize the appearance of a baloxavir-resistance phenotype in comparison to the initial wildtype virus used.

For the untreated and diltiazem-treated experimental arms, infectious supernatants resulting from the $10^{th}$ passage were used. For the baloxavir treatment arm, the infectious supernatant resulting from the $8^{th}$ cell passage was used. For the diltiazem+baloxavir combination treatment arm, the infectious supernatant resulting from the $6^{th}$ cell passage was used (because the viruses were lost at the $7^{th}$ and $9^{th}$ cell passages for these experimental arms, respectively, see FIGS. 6a and 6b).

MDCK cells were thus infected with the infectious supernatants in question, then treated separately one hour after infection with various increasing concentrations of baloxavir (0.04 nM to 160 nM). At the same time, MDCK cells were also infected with the A/H1N1 WT virus initially used for the cell passage P0 (see FIGS. 6a and 6b) at an MOI of 0.001, then treated or not separately one hour post-infection with different increasing concentrations of baloxavir (0.04 nM to 160 nM).

Infectious supernatants were sampled at 48 hpi then the viral load was titrated by the limiting dilution method in TCID50 in MDCK cells. The results were expressed in relative values compared to control cells infected by A/H1N1 virus and not treated (FIGS. 6c to 6g). From these infectious viral titrations, the median inhibitory concentrations of baloxavir were thus calculated and are reported in Table 1 below.

Detailed Presentation of the Results

The graph of FIG. 6*b* represents the concentrations of baloxavir and diltiazem used in the different experimental arms (untreated, treatment with baloxavir, treatment with diltiazem and treatment with the diltiazem+baloxavir combination) for each cell passage, described previously in FIG. 6*a*. The table presents the limiting dilutions of infectious supernatants from each cell passage (for which significant cytopathic effects were observed) and which were used to infect MDCK cells from each subsequent cell passage in each of the four experimental arms (untreated, treatment with baloxavir, treatment with diltiazem and treatment with the diltiazem+baloxavir combination).

The untreated and diltiazem-treated experimental arms were maintained over 10 cell passages. For the arm without treatment, the limiting dilution used for each cell passage was always $10^{-6}$. For the diltiazem treatment arm, the limiting dilution used varied from $10^{-5}$ to $10^{-6}$, as indicated in the graph and the table.

Regarding the baloxavir-treatment arm, the limiting dilution used for each cell passage remained stable at $10^{-5}$ until the $6^{th}$ cell passage, for which the concentration of baloxavir used was 8 nM. From this cell passage, the limiting dilution used for the subsequent cell passages gradually decreased (from $10^{-4}$ to $10^{-1}$) as increasing concentrations of baloxavir were used (from 8 nM up to 32 nM) until the loss of replicative virus at the $9^{th}$ cell passage, for which the concentration of baloxavir used was 64 nM.

In the diltiazem+baloxavir combination treatment arm, the limiting dilutions used (for which significant cytopathic effects were observed) were lower from the first cell passage ($10^{-3}$) and remained stable between $10^{-3}$ and $10^{-2}$ until the $6^{th}$ cell passage. The loss of replicative virus was observed during the $7^{th}$ cell passage, for which the concentrations used of baloxavir and diltiazem were 16 nM and 25 μM, respectively.

These results indicate that in the baloxavir treatment arm, the A/H1N1 virus, for which the initial median inhibitory concentration (IC50) of baloxavir was 0.2 nM, replicated up to the $8^{th}$ cell passage until baloxavir concentration conditions of 32 nM. These results suggest that the selection pressure exerted by baloxavir under these experimental conditions induces a resistance viral phenotype. In return, this viral resistance phenotype was not observed in the diltiazem treatment arm, since just like in the untreated arm, the limiting dilution used for each cell passage remained stable between $10^{-5}$ and $10^{-6}$, without loss of virus until the $10^{th}$ cell passage.

These results also indicate that the addition of diltiazem to baloxavir in the combination treatment arm (diltiazem 25 μM+baloxavir at increasing concentrations from 1 nM to 8 nM) provided a synergistic effect of viral inhibition compared to treatments with diltiazem or baloxavir alone at the same concentrations, since (i) the limiting dilutions used at each cell passage have always been lower in this experimental arm from the first cell passage ($10^{-3}$), and (ii) the replicative virus has was lost more quickly (from the $7^{th}$ cell passage).

FIG. 6c reports the determination of the median inhibitory concentration of baloxavir on A/H1N1 virus resulting from the initial cell passage P0. The IC50 initially determined on A/H1N1 virus used for the experiment is confirmed at 0.2 nM.

FIG. 6d reports the determination of the median inhibitory concentration of baloxavir on the virus resulting from the cell passage P10 of the untreated experimental arm. The calculated IC50 of baloxavir on A/H1N1 virus issued from the $10^{th}$ cell passage without treatment (untreated) is 0.9 nM. This slight increase can be attributed to a viral replication of A/H1N1 virus which adapted to the successive cellular amplification in MDCK cells in this experimental arm.

FIG. 6e reports the determination of the median inhibitory concentration of baloxavir on the virus resulting from the cell passage P10 of the experimental arm treated with diltiazem. The calculated IC50 of baloxavir on A/H1N1 virus issued from the $10^{th}$ cell passage with diltiazem treatment is 0.3 nM. This IC50 is essentially similar to the one determined initially on A/H1N1 virus used for the experiment. This result confirms that treatment with diltiazem at a constant concentration of 25 µM over 10 successive cell passages does not modify the sensitivity of the A/H1N1 virus to baloxavir (and does not induce the emergence of viruses with a baloxavir resistance phenotype).

FIG. 6f reports the determination of the median inhibitory concentration of baloxavir on the virus resulting from the cell passage P8 of the experimental arm treated with baloxavir.

The calculated IC50 of baloxavir on A/H1N1 virus issued from the $8^{th}$ cell passage with baloxavir treatment (in increasing concentration) is 7 nM. This IC50 is much higher than the one determined initially on A/H1N1 virus used for the experiment (IC50=0.2 nM).

This increase, corresponding to 35 times the initial IC50, confirms the emergence of a virus with a baloxavir resistance phenotype, consistent with the observations described in FIG. 6b (lower dilution limits used from the first cell passage in this experimental arm, viral replication effective up to baloxavir concentration conditions of 32 nM at the $8^{th}$ cell passage).

FIG. 6g reports the determination of the median inhibitory concentration of baloxavir on the virus resulting from the cell passage P6 of the experimental arm treated with the diltiazem+baloxavir combination.

The calculated IC50 of baloxavir on A/H1N1 virus issued from the $6^{th}$ cell passage with diltiazem+baloxavir combination treatment (in increasing concentration) is 0.8 nM. This IC50 is very similar to the one calculated for baloxavir in A/H1N1 virus issued from the $10^{th}$ cell passage in the experimental arm without treatment (0.9 nM, see FIG. 6d) and slightly higher than the one calculated initially in A/H1N1 virus used for the experiment and resulting from cell passage P0 (IC50=0.2 nM, see FIG. 6c). Apart from the fact that this slight increase can be attributed to viral replication of the A/H1N1 virus which has adapted to successive cell amplification in MDCK cells in this experimental arm, it is clearly established that this IC50 is very clearly lower than the one calculated for the A/H1N1 virus from the cell passage P8 of the baloxavir treatment experimental arm (IC50=7 nM, see FIG. 6f), indicating the absence of emergence of virus with the baloxavir resistance phenotype in this experimental arm. These results indicate that the use of diltiazem in combination with baloxavir makes it possible to prevent the emergence of baloxavir-resistant virus in a standard test of successive cell passages of viruses under antiviral selection pressure (increasing concentration of baloxavir)

The median inhibitory concentrations of baloxavir for the A/H1N1 virus resulting from the last cell passages of the different experimental arms are presented in Table 1 below.

TABLE 1

| Experimental arm | IC50 baloxavir (active form) |
|---|---|
| H1N1 WT Initial P0 | 0.2 nM |
| H1N1 NT P10 | 0.9 nM |
| H1N1 Dil P10 | 0.3 nM |
| H1N1 baloxavir marboxil P8 | 7 nM |
| H1N1 Combination P6 | 0.8 nM |

In conclusion, the results of this experiment of successive cell passages in MDCK cells of A/H1N1 virus under selection pressure conditions indicate that, as expected, the use of increasing concentrations of baloxavir induced the emergence of an A/H1N1 virus with the baloxavir resistance phenotype, while under the same conditions of increasing concentration of baloxavir, the addition in combination of diltiazem at a constant concentration of 25 µM makes it possible to prevent the emergence of a A/H1N1 virus with the baloxavir resistance phenotype.

Similarly and as expected, the untreated experimental condition did not induce the emergence of an A/H1N1 virus with the baloxavir resistance phenotype.

Likewise, the experimental condition with treatment by diltiazem alone also did not induce the emergence of an A/H1N1 virus with the baloxavir resistance phenotype.

BIBLIOGRAPHIC REFERENCES in the Order of Citation in the Description

PATENTS

WO 87/07508
WO 2011/066657
WO 2016/146836
WO 2019/224489
WO 02/094238
U.S. Pat. No. 4,605,552

ARTICLES

Pizzorno A, Terrier O, Nicolas de Lamballerie C, Julien T, Padey B, Traversier A, Roche M, Hamelin M E, Rheaunne C, Croze S, Escuret V, Poissy J, Lina B, Legras-Lachuer C, Textoris J, Boivin G, Rosa-Calatrava M. Repurposing of Drugs as Novel Influenza Inhibitors From Clinical Gene Expression Infection Signatures. Front Immunol. 2019 Jan. 29; 10:60.

Pizzorno A, Padey B, Terrier O, Rosa-Calatrava M. Drug Repurposing Approaches for the Treatment of Influenza Viral Infection: Reviving Old Drugs to Fight Against a Long-Lived Enemy. Front Immunol. 2019 Mar. 19; 10:531. (Review)

Wang W, Shin W J, Zhang B, Choi Y, Yoo J S, Zimmerman M I, Frederick T E, Bowman G R, Gross M L, Leung D W, Jung J U, Amarasinghe G K. The Cap-Snatching SFTSV Endonuclease Domain Is an Antiviral Target. Cell Rep. 2020 Jan. 7; 30(1):153-163.e5.

Onnoto S, Speranzini V, Hashimoto T, Noshi T, Yamaguchi H, Kawai M, Kawaguchi K, Uehara T, Shishido T, Naito A, Cusack S. Characterization of influenza virus variants induced by treatment with the endonuclease inhibitor baloxavir marboxil. Sci Rep. 2018 Jun. 25; 8(1):9633.

Uehara T, Hayden F G, Kawaguchi K, Omoto S, Hurt A C, De Jong M D, Hirotsu N, Sugaya N, Lee N, Baba K, Shishido T, Tsuchiya K, Portsmouth S, Kida H. Treatment-Emergent Influenza Variant Viruses With Reduced Baloxavir Susceptibility: Impact on Clinical and Virologic Outcomes in Uncomplicated Influenza. J Infect Dis. 2019 Jul. 16.

Takashita E, Kawakami C, Ogawa R, Morita H, Fujisaki S, Shirakura M, Miura H, Nakamura K, Kishida N, Kuwahara T, Ota A, Togashi H, Saito A, Mitamura K, Abe T, Ichikawa M, Yamazaki M, Watanabe S, Odagiri T. Influenza A(H3N2) virus exhibiting reduced susceptibility to baloxavir due to a polymerase acidic subunit I38T substitution detected from a hospitalised child without prior baloxavir treatment, Japan, January 2019. Euro Surveill. 2019 March; 24(12).

Hayden F G, Shindo N. Influenza virus polymerase inhibitors in clinical development. Curr Opin Infect Dis. 2019 April; 32(2): 176-186

Fukao K, Noshi T, Yamamoto A, Kitano M, Ando Y, Noda T, Baba K, Matsumoto K, Higuchi N, Ikeda M, Shishido T, Naito A. Combination treatment with the cap-dependent endonuclease inhibitor baloxavir marboxil and a neuraminidase inhibitor in a mouse model of influenza A virus infection. J Antimicrob Chemother. 2019 Mar. 1; 74(3):654-662.

Hayden F G, Sugaya N, Hirotsu N, Lee N, de Jong M D, Hurt A C et al. Baloxavir Marboxil for Uncomplicated Influenza in Adults and Adolescents. N Engl J Med, 2018 Sep. 6; 379(10):913-23

Noshi T, Kitano M, Taniguchi K, Yamamoto A, Omoto S, Baba K, et al. In vitro characterization of baloxavir acid, a first-in-class cap-dependent endonuclease inhibitor of the influenza virus polymerase PA subunit. Antiviral Res. 2018; 160:109-17.

Clark M P, Ledeboer M W, Davies I, Byrn R A, Jones S M, Perola E, et al. Discovery of a novel, first-in-class, orally bioavailable azaindole inhibitor (VX-787) of influenza PB2. J Med Chem. 2014; 57 (15):6668-78.

Trevejo J M, Asmal M, Vingerhoets J, Polo R, Robertson S, Jiang Y, et al. Pimodivir treatment in adult volunteers experimentally inoculated with live influenza virus: a Phase IIa, randomized, double-blind, placebo-controlled study. Antivir Ther. 2018; 23(4):335644

Yousuke Furuta, Kazumi Takahashi, Kimiyasu Shiraki, Kenichi Sakamoto, Donald F. Smee, Dale L. Barnard, Brian B. Gowen, Justin G. Julander and John D. Morrey, "T-705 (favipiravir) and related compounds: Novel broad-spectrum inhibitors of RNA viral infections", Antiviral Research, vol. 82, no 3., June 2009, p. 95-102.

Goldhill D H, Te Velthuis A J W, Fletcher R A, Langat P, Zambon M, Lackenby A, Barclay W S. The mechanism of resistance to favipiravir in influenza. Proc Natl Acad Sci USA. 2018 Nov. 6; 115(45):11613-11618.

The invention claimed is:

1. A combination of diltiazem and at least one viral polymerase inhibitor compound selected from the group consisting of: baloxavir marboxil, pimodivir, RO-7 and CC-42344.

2. The combination according to claim 1 consisting in diltiazem and baloxavir marboxil.

3. The combination according to claim 1, further comprising at least one other active agent.

4. The combination according to claim 1, wherein the at least one other active agent is an antiviral agent.

5. The combination according to claim 1, wherein the at least one other active agent is an antibiotic.

6. The combination according to claim 1, wherein the at least one other active agent is an antiviral agent and an antibiotic.

7. A method for treating a patient having a viral infection, comprising the administration to said patient of a combination according to claim 1.

8. A method for preventing the appearance of a viral infection in an individual susceptible of being infected by a virus, comprising the administration to said individual of a combination according to claim 1.

9. The method according to claim 7, wherein the viral infection is an infection of the respiratory and/or intestinal tract.

10. The method according to claim 9, wherein the viral infection is an influenza virus infection.

11. The method according to claim 10, wherein said influenza virus is resistant to the inhibitory action of at least one antiviral compound.

12. The method according to claim 11, wherein said at least one antiviral compound is an anti-influenza compound.

13. The method according to claim 12, wherein said at least one anti-influenza compound is a viral polymerase inhibitor.

14. A veterinary method for preventing and/or treating a viral infection in an infected animal or an animal susceptible of being infected, comprising the administration to said animal of a combination according to claim 1.

15. The veterinary method of claim 14, wherein the viral infection is an infection of the respiratory and/or intestinal tract.

16. The veterinary method of claim 14, wherein the viral infection is an influenza virus infection.

17. The veterinary method according to claim 16, characterized in that said influenza virus is resistant to the inhibitory action of at least one antiviral compound.

18. The method according to claim 17, wherein said at least one antiviral compound is an anti-influenza compound.

19. The method according to claim 18, wherein said at least one anti-influenza compound is a viral polymerase inhibitor.

20. A pharmaceutical composition comprising, in a pharmaceutical vehicle, a combination of diltiazem and at least one viral polymerase inhibitor according to claim 1.

21. A pharmaceutical composition comprising, in a pharmaceutical vehicle, a combination of diltiazem and at least one viral polymerase inhibitor according to claim 3.

22. The pharmaceutical composition according to claim 20, wherein said pharmaceutical composition is in an appropriate dosage form for administration by inhalation.

23. The method according to claim 7, comprising the simultaneous, separate or sequential administration to a patient of a combination product comprising diltiazem and at least one viral polymerase inhibitor compound selected from the group consisting of: baloxavir marboxil, pimodivir, RO-7 and CC-42344.

24. The method according to claim 14, comprising the simultaneous, separate or sequential administration to an individual susceptible of being infected by a virus, of a combination product comprising diltiazem and at least one viral polymerase inhibitor compound selected from the group consisting of: baloxavir marboxil, pimodivir, RO-7 and CC-42344.

25. The veterinary method according to claim 14, comprising the simultaneous, separate or sequential administration to an infected animal or an animal susceptible of being infected, of a combination product comprising diltiazem and at least one viral polymerase inhibitor compound selected from the group consisting of: baloxavir marboxil, pimodivir, RO-7 and CC-42344.

* * * * *